(12) United States Patent
Hamashima

(10) Patent No.: US 11,622,051 B2
(45) Date of Patent: Apr. 4, 2023

(54) IMAGE READING SYSTEM, IMAGE READING CONTROL APPARATUS, AND IMAGE READING METHOD

(71) Applicant: SEIKO EPSON CORPORATION, Tokyo (JP)

(72) Inventor: Shintaro Hamashima, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/455,936

(22) Filed: Nov. 22, 2021

(65) Prior Publication Data
US 2022/0166893 A1 May 26, 2022

(30) Foreign Application Priority Data
Nov. 24, 2020 (JP) .............................. JP2020-194686

(51) Int. Cl.
*H04N 1/40* (2006.01)
*H04N 1/00* (2006.01)
*G06F 3/04847* (2022.01)

(52) U.S. Cl.
CPC ..... *H04N 1/00461* (2013.01); *G06F 3/04847* (2013.01); *H04N 1/00442* (2013.01); *H04N 1/00458* (2013.01); *H04N 1/00469* (2013.01); *H04N 1/00811* (2013.01); *H04N 1/00824* (2013.01)

(58) Field of Classification Search
CPC ........... H04N 1/00461; H04N 1/00442; H04N 1/00458; H04N 1/00469; H04N 1/00811; H04N 1/00824
See application file for complete search history.

(56) References Cited

U.S. PATENT DOCUMENTS

| 2011/0228348 | A1* | 9/2011 | Muraishi | G06T 7/40 358/448 |
| 2012/0072839 | A1* | 3/2012 | Ogino | G06F 3/0485 715/274 |
| 2014/0376022 | A1* | 12/2014 | Muraishi | H04N 1/00448 358/1.13 |
| 2016/0255222 | A1* | 9/2016 | Sakata | H04N 1/00803 358/1.13 |
| 2017/0180580 | A1 | 6/2017 | Tanaka | |
| 2019/0068839 | A1* | 2/2019 | Narita | G06T 7/90 |

FOREIGN PATENT DOCUMENTS

JP          2017-118169 A      6/2017

* cited by examiner

*Primary Examiner* — Moustapha Diaby
(74) *Attorney, Agent, or Firm* — Workman Nydegger

(57) ABSTRACT

An image reading system including a blank paper removal function includes a preview display processing unit configured to preview-display at least a portion of an image among images of a read document in a selectable state on a display unit, a display switching unit configured to switch a display mode of an image to a selected state in which a blank paper removal candidate or a non-removal candidate is selected when the image is selected by an operation of an input unit, a data generation unit, and a blank paper removal level setting unit. The data generation unit generates reading data based on remaining image data obtained by removing image data of a blank paper removal target including the confirmed blank paper removal candidate from image data of the document when the selected state is confirmed by an operation of an input unit.

15 Claims, 18 Drawing Sheets

| BLANK PAPER REMOVAL FUNCTION | CHARACTER-ABSENT DOCUMENT DISPLAY FUNCTION | CHARACTER-PRESENT DOCUMENT NON-DISPLAY FUNCTION | PREVIEW SCREEN DISPLAY FUNCTION |
|---|---|---|---|
| ON | ON | ON | ON |
| | OFF | OFF | |
| OFF | OFF | OFF | OFF |
| | OFF | OFF | |

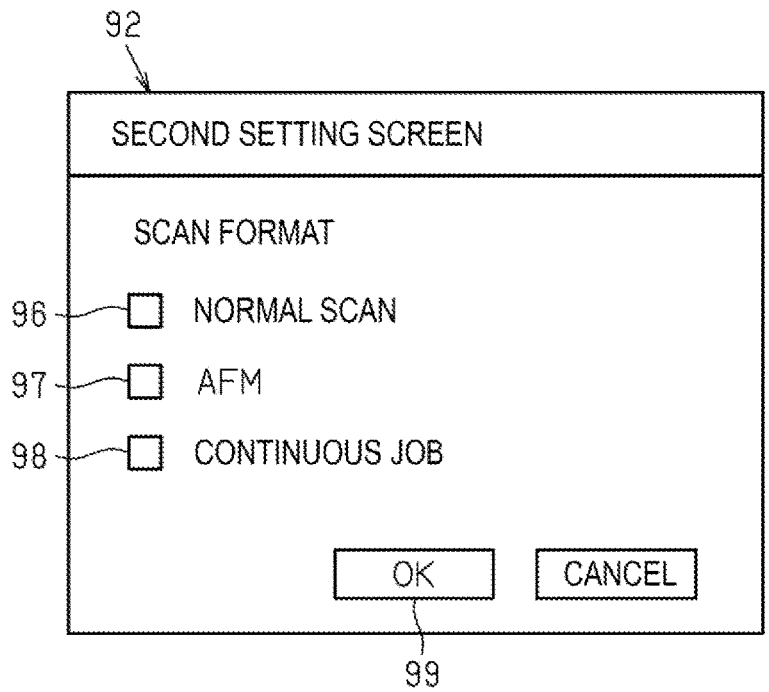

FIG. 6

| SCAN FORMAT (SCAN MODE) | PREVIEW SCREEN DISPLAY TIMING | BLANK PAPER REMOVAL LEVEL SETTING VALUE REFLECTION TIMING |
|---|---|---|
| NORMAL SCAN | AFTER JOB IS ENDED | FROM NEXT JOB |
| AFM | AFTER SCAN OF DOCUMENT BUNDLE IS COMPLETED | FROM NEXT DOCUMENT BUNDLE SCAN |
| CONTINUOUS JOB | AFTER SCAN OF DOCUMENT BUNDLE IS COMPLETED | FROM NEXT DOCUMENT BUNDLE SCAN |
| AFM AND CONTINUOUS JOB | AFTER SCAN OF DOCUMENT BUNDLE IS COMPLETED | FROM NEXT DOCUMENT BUNDLE SCAN |

FIG. 7

| BLANK PAPER REMOVAL LEVEL | THRESHOLD VALUE PS0 |
|---|---|
| 1 | 50 |
| 2 | 100 |
| 3 | 150 |
| 4 | 200 |
| ... | ... |
| 14 | 9000 |
| 15 | 10000 |
| 16 | 11000 |
| ... | ... |
| 28 | 56000 |
| 29 | 60000 |
| 30 | 65000 |

| SD3 SCAN FORMAT (SCAN MODE) | PREVIEW SCREEN DISPLAY TIMING | BLANK PAPER REMOVAL LEVEL SETTING VALUE REFLECTION TIMING |
|---|---|---|
| NORMAL SCAN | AFTER JOB IS ENDED | FROM NEXT JOB |
| AFM AND CONTINUOUS JOB | AFTER JOB IS ENDED | FROM NEXT JOB |

IMAGE READING SYSTEM, IMAGE READING CONTROL APPARATUS, AND IMAGE READING METHOD

The present application is based on, and claims priority from JP Application Serial Number 2020-194686, filed Nov. 24, 2020, the disclosure of which is hereby incorporated by reference herein in its entirety.

BACKGROUND

1. Technical Field

The present disclosure relates to an image reading system including an image reading apparatus that reads an image from a document, an image reading control apparatus, and an image reading method.

2. Related Art

For example, JP-A-2017-118169 discloses an image reading apparatus that reads an image from a document. The image reading apparatus has a blank paper removal function of removing a blank paper page from an image obtained by reading a plurality of sheets of documents. The image reading apparatus includes an ADF that feeds the document to a reading position, and a blank paper determination unit that determines whether the document is a blank paper document using image information responding to each line sensor of the color line sensor, in the image information that has been read. The blank paper determination unit determines whether the document is a blank paper document from image information responding to each line sensor of the color line sensor.

However, in the image reading apparatus described in JP-A-2017-118169, there is a problem in which an image of the document that a user does not want to be removed as blank paper is removed as a blank paper page, or an image of the document that the user wants to be removed as a blank paper page is not removed as a blank paper page.

SUMMARY

In order to solve the problem described above, an image reading system including an image reading apparatus that reads a document and an image reading control apparatus that controls the image reading apparatus and including a blank paper removal function of removing an image of a blank paper removal candidate that satisfies a blank paper removal level among images of the document read by the image reading apparatus, as a blank paper page, includes a preview display processing unit configured to preview-display at least a portion of an image among images of a read document in a selectable state on a display unit, a display switching unit configured to switch a display mode of the image to a selected state in which a blank paper removal candidate or a non-removal candidate is selected when the image is selected by an operation of an input unit, a data generation unit configured to, when the selected state is confirmed by an operation of the input unit, generate reading data based on remaining image data obtained by removing image data of a blank paper removal target including the confirmed blank paper removal candidate from image data of the document, and a blank paper removal level setting unit configured to set a blank paper removal level for selecting the confirmed image in the selected state as a blank paper removal candidate.

In order to solve the problem described above, an image reading control apparatus for controlling an image reading apparatus that reads a document, the image reading control apparatus including a blank paper removal function of removing an image that satisfies a blank paper removal level as a blank paper page among images of the document read by the image reading apparatus, includes a preview display processing unit configured to preview-display at least a portion of an image among images of the document read by the image reading apparatus in a selectable state on a display unit, a display switching unit configured to switch a display mode of the image to a selected state in which a blank paper removal candidate or a non-removal candidate is selected when the image is selected by an operation of an input unit, a data generation unit configured to, when the selected state is confirmed by an operation of the input unit, generate reading data based on remaining image data obtained by removing image data of a blank paper removal target including the confirmed blank paper removal candidate from image data of the document, and a blank paper removal level setting unit configured to set a blank paper removal level for selecting the confirmed image in the selected state as a blank paper removal candidate.

In order to solve the problem described above, an image reading apparatus including a blank paper removal function of removing an image that satisfies a blank paper removal level among images obtained by reading an document, as a blank paper page, includes a preview display processing unit configured to preview-display at least a portion of an image among images of a read document in a selectable state on a display unit, a display switching unit configured to switch a display mode of the image to a selected state in which a blank paper removal candidate or a non-removal candidate is selected when the image is selected by an operation of an input unit, a data generation unit configured to, when the selected state is confirmed by an operation of the input unit, generate reading data based on remaining image data obtained by removing image data of a blank paper removal target including the confirmed blank paper removal candidate from image data of the document, and a blank paper removal level setting unit configured to set a blank paper removal level for selecting the confirmed image in the selected state as a blank paper removal candidate.

In order to solve the problem described above, an image reading method performing blank paper removal processing of removing an image that satisfies a blank paper removal level as a blank paper page among images obtained by reading a document by an image reading apparatus, includes preview-displaying at least a portion of an image among images of a read document in a selectable state on a display unit, switching a display mode of the image to a selected state in which a blank paper removal candidate or a non-removal candidate is selected when the image is selected by an operation of an input unit, generating, when the selected state is confirmed by an operation of the input unit, reading data based on remaining image data obtained by removing image data of a blank paper removal target including the confirmed blank paper removal candidate from image data of the document, and setting a blank paper removal level for selecting the confirmed image in the selected state as a blank paper removal candidate.

In order to solve the problem described above, a program executed by a computer implementing a blank paper removal function of removing an blank paper page that satisfies a blank paper removal level among images of a document read by an image reading apparatus, in the computer, executes a preview display processing step of preview-displaying at least a portion of an image among images of a document read by the image reading apparatus in a selectable state on a display unit, a display switching step of switching a display mode of the image to a selected state in which a blank paper removal candidate or a non-removal candidate is selected when the image is selected by an operation of an input unit, a data generation step of generating, when the selected state is confirmed by an operation of the input unit, reading data based on remaining image data obtained by removing image data of a blank paper removal target including the confirmed blank paper removal candidate from image data of the document, and a blank paper removal level setting step of setting a blank paper removal level for selecting the confirmed image in the selected state as a blank paper removal candidate.

BRIEF DESCRIPTION OF THE DRAWINGS

FIG. 6 is a diagram illustrating a second setting screen.

FIG. 7 is a diagram illustrating a second management table.

FIG. 8 is a diagram illustrating a blank paper determination table.

DESCRIPTION OF EXEMPLARY EMBODIMENTS

First Embodiment

Hereinafter, the first embodiment of an image reading apparatus will be described with reference to the accompanying figures.

Figure 1:
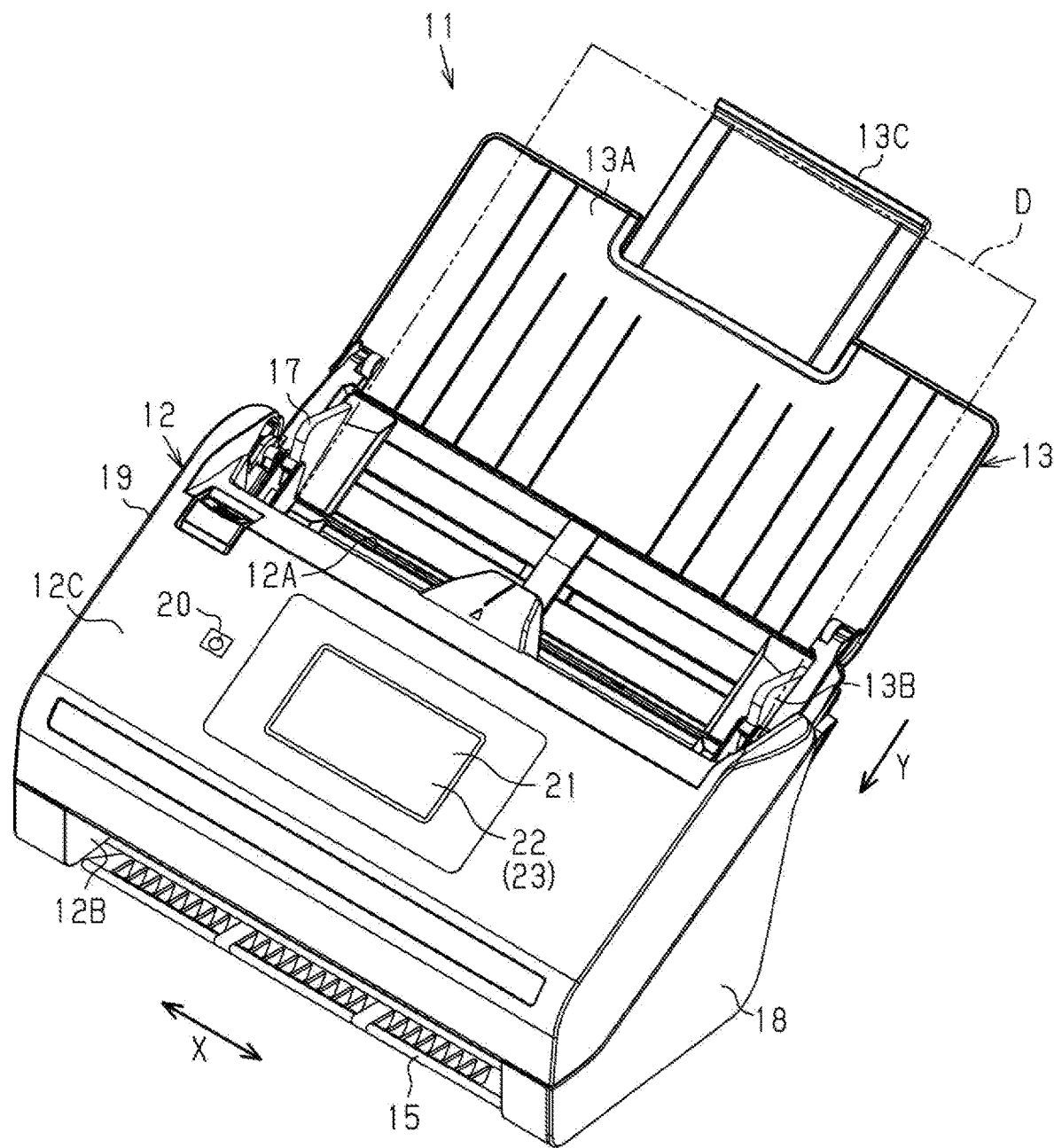
FIG. 1 is a perspective view illustrating an image reading apparatus according to a first embodiment.

As illustrated in FIG. 1, an image reading apparatus 11 of the present embodiment includes a main body 12 having a substantially trapezoidal shape in a side view, and a document support 13 on which a document that is an image reading target is placed (set). The main body 12 houses a stacker 15 in a state such that the stacker 15 is configured to slide in the front and back direction on the lower side of a discharge port 12B.

The document support 13 has a planar placement surface 13A configured to place a plurality of sheets of documents D by extending obliquely upward to the rear side of the main body 12. The document support 13 is provided with a pair of edge guides 13B configured to slide in a width direction X that intersects (in particular is orthogonal to) a transport direction Y in which the document D is transported. The document D loaded on the placement surface 13A is sandwiched between the pair of edge guides 13B, and is positioned in the width direction X with respect to a feeding port 12A. The document support 13 includes a document positioning mechanism 17 that includes a slide mechanism that slides the pair of edge guides 13B in the width direction X in association with each other. In addition, a slide type auxiliary support unit 13C is provided on the placement surface 13A of the document support 13 to be configured to move in and out. The document D loaded on the placement surface 13A is positioned in the transport direction Y with respect to the feeding port 12A by coming into contact with the slide type auxiliary support unit 13C. The width direction X is a main scanning direction when the image reading apparatus 11 reads the image of the document D, and the transport direction Y is the secondary scanning direction.

The document D placed on the document support 13 is fed into the main body 12 one sheet at a time from the feeding port 12A that opens to the upper portion of the main body 12. The fed document D is transported within the main body 12 along a predetermined transport path 29 (see FIG. 2), and is discharged from the discharge port 12B that opens to the lower front portion of the main body 12 after the image is read in a reading area SA in the middle of the transport.

A power button 20 is provided on a front surface unit 12C of the main body 12. The front surface unit 12C of the main body 12 is provided with, for example, a display unit 22 such as a liquid crystal panel for displaying a predetermined image in a display area 23. The display unit 22 is configured to display information related to the image reading apparatus 11. The display unit 22 is provided with, for example, an input unit 21 such as a touch panel configured to detect a touch operation by a user. The input unit 21 is configured to be suited for inputting the necessary information according to a touch operation by a user when providing an instruction to the image reading apparatus 11.

Figure 2:
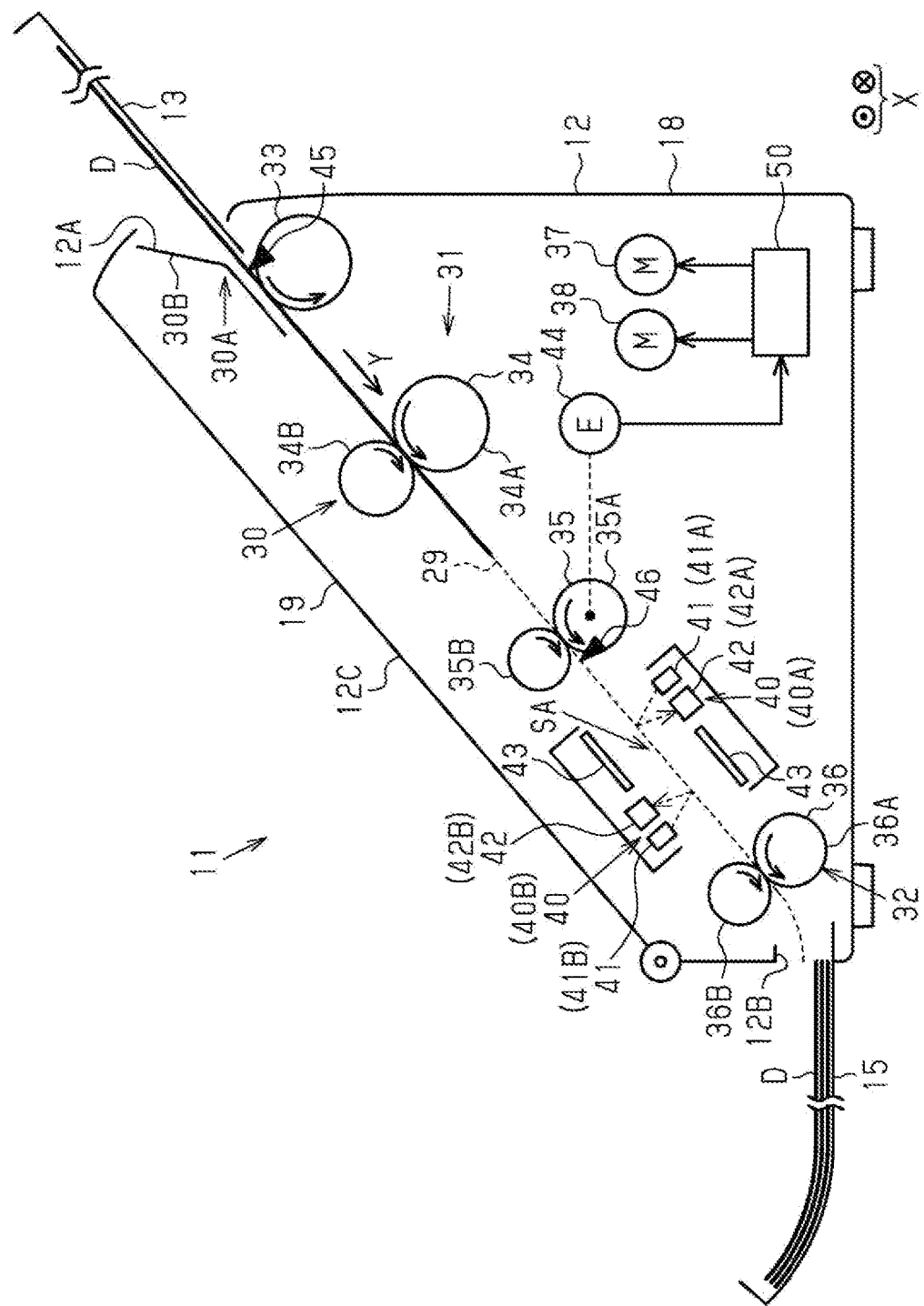
FIG. 2 is a schematic side cross-sectional view illustrating the image reading apparatus.

As illustrated in FIG. 2, the main body 12 includes the main body unit 18 and a cover unit 19 pivotally coupled around the front end portion of the main body unit 18. The main body 12 has the transport path 29 (transport passage) extending between the main body unit 18 and the cover unit 19 from the feeding port 12A to the discharge port 12B.

A transport mechanism 30 that transports the document D is provided within the main body 12. The transport mechanism 30 includes a feeding unit 30A that guides and feeds the document D loaded (set) onto the document support 13 one sheet at a time into the main body 12, a transport unit 31 that transports the fed document D to pass through the reading area SA along the transport path 29, and a discharge unit 32 that discharges the document D after the image is read in the middle of the transport by the transport unit 31. The transport mechanism 30 has an automatic document feeding function of transporting the plurality of sheets of documents D loaded on the document support 13 sequentially one sheet at a time along the transport path 29 to pass through the reading area SA.

The feeding unit 30A is provided with one feeding roller 33 (pick-up roller) facing a feeding guide 30B at an upstream end position of the transport path 29 in the main body 12. The feeding unit 30A feeds the plurality of sheets of documents D loaded on the document support 13 one sheet at a time from the feeding port 12A along the feeding guide 30B.

The transport unit 31 includes a feeding roller pair 34 disposed at a position downstream of the feeding roller 33 in the transport direction Y, and a transport roller pair 35 disposed at a position upstream of the reading area SA in the transport direction Y. The feeding roller pair 34 is constituted with a driving roller 34A and a separation roller 34B (retarder roller). The transport roller pair 35 is constituted with a driving roller 35A and a driven roller 35B.

The discharge unit 32 includes a discharge roller pair 36 disposed at a position downstream of the reading area SA in the transport direction Y. The discharge roller pair 36 is constituted with a driving roller 36A and a driven roller 36B. The discharge roller pair 36 is also responsible for transportation during the reading of the document D together with the transport roller pair 35.

In this manner, the feeding roller 33, the feeding roller pair 34, the transport roller pair 35, and the discharge roller pair 36 are disposed in this order upstream of the transport direction Y, and each pair is disposed at intervals in the width direction X.

The plurality of rollers 33 and 34A of the feeding system are driven to rotate by the motive power of a feeding motor 37, which is a power source. The plurality of sheets of documents D loaded on the document support 13 are fed into the main body 12 from the feeding port 12A sequentially one sheet at a time from the lowest one by the feeding roller 33. In this manner, the feeding unit 30A (the roller 33 and 34A, or the like) is driven by the feeding motor 37 as a power source.

In addition, the separation roller 34B of the feeding system and the driving rollers 35A and 36A of the transport system are driven to rotate by the motive power of the transport motor 38, which is the power source. The document D fed into the main body 12 by the feeding roller 33 is discharged from the discharge port 12B after being transported to the reading area SA. In this manner, the transport unit 31 (feeding roller pair 34 or the like) and the discharge unit 32 (discharge roller pair 36 or the like) are driven by the transport motor 38 as a common power source.

In addition, the driving rollers 35A and 36A are driven to rotate to transport the document D at the same transport speed (reading speed) when the document D is read. Each of the driven rollers 35B and 36B is rotated by the rotation of the driving rollers 35A and 36A that are paired, respectively.

In addition, an encoder 44 (for example, a rotary encoder) configured to measure the rotation of one driving roller of the transport system among the plurality of roller pairs 34 to 36 is provided in the main body 12. The encoder 44 outputs a measurement signal including a number of pulses proportional to the amount of rotation of the driving roller, to a control unit 50 (controller). Accordingly, the control unit 50 can grasp the position (transport position) and grasp the transport speed of the document D during the transportation in the control unit 50 based on the measurement signal of the encoder 44.

In addition, a document sensor 45 that detects the presence or absence of the document D set in the document support 13 is disposed between the pair of feeding rollers 33. The document sensor 45 is a contact type sensor having, for example, a lever, and when the document D is set in the document support 13, the set document D presses the lever to turn on.

In addition, a document presence and absence sensor 46 configured to measure the presence or absence of the document D is disposed at a position slightly downstream of the nip point of the transport roller pair 35 in the transport direction Y. The document presence and absence sensor 46 is a contact type sensor having, for example, a lever (contact element). The document presence and absence sensor 46 detects the document D and turns on when the front end of the document D presses the lever, and does not detect the document D and turns off when the rear end of the document D passes and the lever is no longer pressed. Accordingly, the control unit 50 detects that the front end of the document D has passed through the transport roller pair 35 and that the rear end of the document D has passed through the transport roller pair 35 based on the detection signal (ON and OFF) of the document presence and absence sensor 46. The detection result of the document presence and absence sensor 46 detecting the front end and the rear end of the document D is used for controlling the start and end timings of the reading operation of a reading unit 40 (40A and 40B) described below. In addition, since the document presence and absence sensor 46 is configured to measure the front end and the rear end of the document D, the document presence sensor 46 can measure the length of the document D in the transport direction Y, that is, the document size determined from the length, based on the transport distance of the document D from the measurement of the front end of the document D to the measurement of the rear end thereof. The document presence and absence sensor 46 may be a non-contact sensor such as an optical type sensor.

The reading unit 40 that reads an image is provided in the main body 12 of the image reading apparatus 11. A pair of reading units 40 is provided on both sides that sandwich the transport path 29 at a position between the transport roller pair 35 and the discharge roller pair 36 in the transport direction Y. In the present embodiment, the pair of reading units 40 includes a first reading unit 40A that reads the front surface (lower surface) of the document D transported along the transport path 29, and a second reading unit 40B that reads the back surface (upper surface) of the document D transported along the transport path 29, which are disposed at a position slightly offset from each other in the transport direction Y, but may also be configured without including one of the reading units.

The pair of reading units 40 are constituted with a light source 41 configured to irradiate the document D being transported with light by irradiating the reading area SA with light, and an image sensor 42 configured to read an image from the document D. In the normal reading mode, only the first reading unit 40A performs a reading operation to read the front surface of the document D, and in the double-sided reading mode, both the first reading unit 40A and the second reading unit 40B perform a reading operation to read both surfaces (front and back surfaces) of the document D.

The light source 41 is constituted with, for example, an LED, a fluorescent lamp, or the like. The image sensor 42 receives the reflected light resulted from light generated by the irradiation from the light source 41 reflected at the document D, converts the received light into an electrical signal, and outputs a pixel signal having a value corresponding to the amount of light received. In this manner, the image sensor 42 is a sensor that reads an image. The image sensor 42 is, for example, a linear image sensor. The image reading apparatus 11 is configured to perform a color scan and a monochrome scan (gray scale scan). Hereinafter, the light source 41 and the image sensor 42 may be referred to as a first light source 41A and a first image sensor 42A when referring to the side of the first reading unit 40A, and may be referred to as a second light source 41B and a second image sensor 42B when referring to the side of the second reading unit 40B.

The image sensor 42 is, for example, a contact type image sensor in which a plurality of photoelectric conversion elements are disposed in a row along the main scanning direction X. Further, the image sensor 42 is a complementary metal oxide semiconductor (CMOS) image sensor. The image sensor 42 performs photoelectric conversion on the light received by each photoelectric conversion element and outputs a pixel signal having a value corresponding to the amount of light received.

Further, a color reference plate 43 is disposed to face the image sensor 42 with the transport path 29 sandwiched therebetween. The color reference plate 43 includes the area of the document D and is disposed in an area wider than the area of the document D, among the areas that are to be the reading targets of the reading unit 40. Accordingly, it is a member configured to grasp whether the image read by the reading unit 40 is the area of the document D is. In other words, the color reference plate 43 is a background plate that is read as a background of the document D. In addition, the color reference plate 43 is a member for obtaining a white reference value for shading correction, and a white reference plate exhibiting white color or a gray reference plate exhibiting gray (gray color) is used. As a result, the color reference plate 43 is read as a white reference image, and a white reference value is generated based on the white reference image that has been read. In the case of a gray reference plate, it is also used to read as a background (gray background) of the document to measure the position and area of the document D. When a sensor for measuring the document area is separately provided, the color reference plate 43 is preferably a white reference plate. In addition, the color reference plate 43 is not limited to a plate shape, and the shape and color thereof may be any reference member for obtaining a white reference value that serves as a reference for luminance.

In a state of the absence of the document D, the reading unit 40 is configured to read the color reference plate 43, which is a background plate. In addition, when reading the document D, it is possible to read the blank space of the tip end portion of the document D in the transport direction Y or the blank space of the rear end portion of the document in the transport direction Y. Assuming that the blank space of the tip end portion or the rear end portion of the color reference plate 43 and the document D is not contaminated, dirt such as paper powder or dust that is adhered to at least one of the light source 41 and the image sensor 42 can be read by reading the blank space of the color reference plate 43 or the document D. In the present embodiment, dirt measurement is performed to measure dirt adhered to at least one of the light source 41 and the image sensor 42 based on the reading data obtained by reading the blank space of the tip end portion or the rear end portion of the color reference plate 43 or the document D. The details of the dirt measurement processing are described later.

The image reading apparatus 11 includes the control unit 50. The control unit 50 controls the image reading apparatus 11 when a job that reads an image from the document D is input based on an operation signal from the input unit 21 (see FIG. 1) operated by a user or a reading instruction signal (reading instruction) from a host apparatus 100 described later. When reading control is performed, the control unit 50 controls the feeding motor 37, the transport motor 38, and the reading unit 40 (40A and 40B), and processes image data based on the image that has been read from the document D by the reading unit 40.

Electrical Configuration

Next, with reference to FIG. 3, the electrical configuration of the image reading system 10 including the image reading apparatus 11 will be described.

Figure 3:
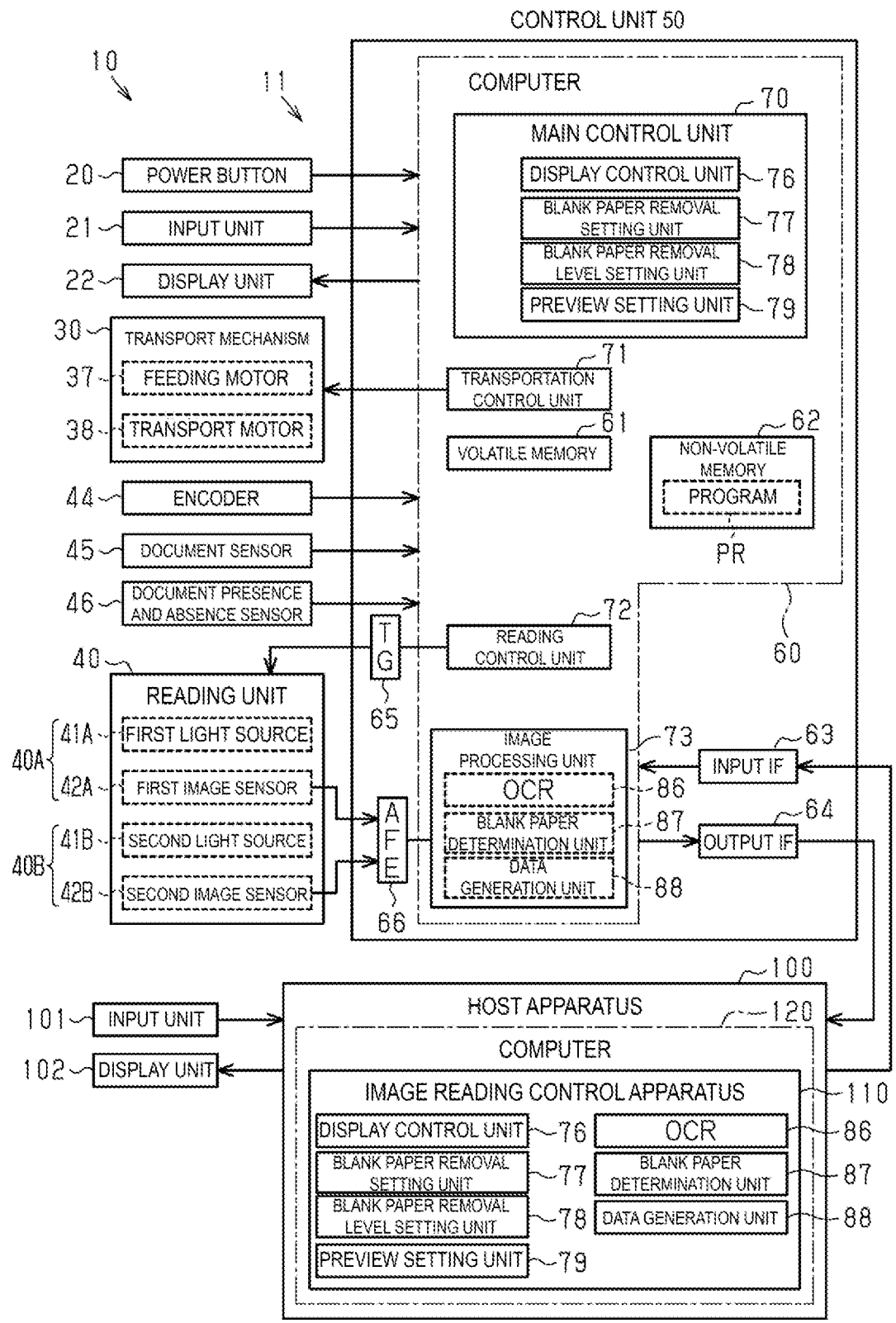
FIG. 3 is a block diagram illustrating an electrical configuration of the image reading apparatus.

As illustrated in FIG. 3, the image reading system 10 includes the image reading apparatus 11 that reads the document D, and an image reading control apparatus 110 that controls the image reading apparatus 11. The image reading system 10 includes a blank paper removal function of removing the blank paper page from the image of the document D read by the image reading apparatus 11. The image reading control apparatus 110 is included in the host apparatus 100 that is communicatively coupled to the image reading apparatus 11. A program including a scan driver and a program is installed on a computer 120 in the host apparatus 100. The image reading control apparatus 110 is constituted with software configured by the computer 120 that executes the program. The image reading control apparatus 110 may be a scan driver or may be supporting software of the image reading apparatus 11. The image reading control apparatus 110 causes the display unit 102 to display various screens in accordance with an instruction from the input unit 101 of the host apparatus 100, and causes the image reading apparatus 11 to execute scan at a predetermined scan condition. The details of the blank paper removal function of the image reading system 10 will be described later.

First, an electrical configuration of image reading apparatus 11 will be described. The image reading apparatus 11 is coupled to the host apparatus 100 through a communication cable. The host apparatus 100 is, for example, a personal computer (hereinafter, also referred to as "PC"), and includes an input unit 101 and a display unit 102 that are electrically coupled to the main body. The host apparatus 100, in which a reading driver program is installed, includes a reading driver constituted with software having a function of performing a reading instruction on the image reading apparatus 11 therein. The host apparatus 100 is not limited to a PC, and may be a smart device such as a personal digital assistant (PDA), a tablet PC, and a smart phone, or the like.

When the input unit 21 or the input unit 101 of the host apparatus 100 is operated by the user, a setting condition related to the image reading processing is set. In other words, the setting condition is set by the user input. The setting condition includes a reading condition including a document size, a reading resolution, a reading color, single-sided reading and two-sided reading, or the like, and a storage condition including a storage format of reading data (image data), a transfer method, and a storage destination. The document size includes, for example, an A4 size, a B5 size, or the like, and the reading resolution includes, for example, 300 dpi and 600 dpi, and the reading color is monochrome (gray scale) and color. The storage format includes a PDF format, a PDF/A format, a JPEG format, a GIF format, a TIFF format, or the like. In addition, the transfer method includes transfer to the host apparatus 100 and mail transfer, and the address of the storage destination is specified at the storage destination.

Figure 13:
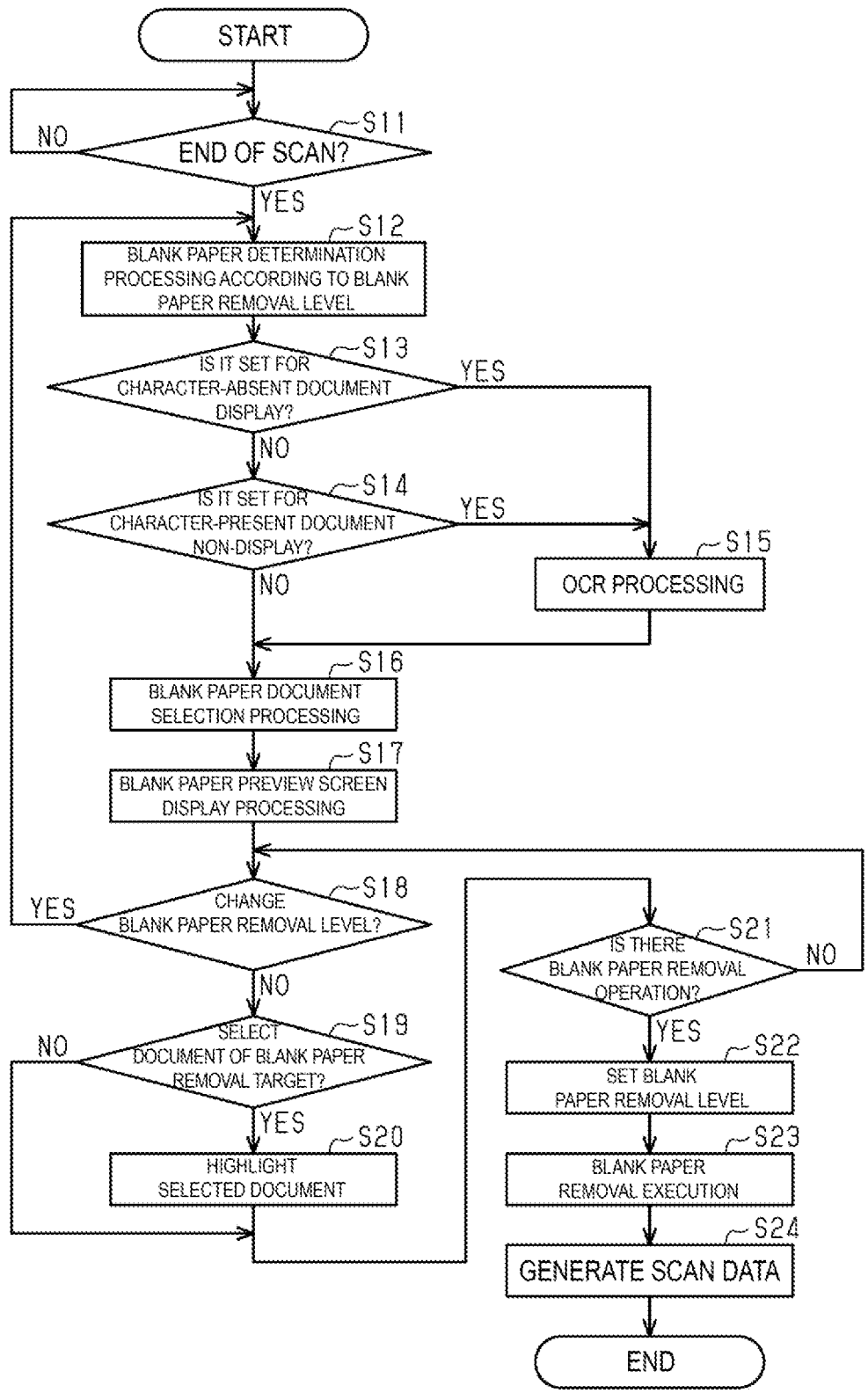
FIG. 13 is a flowchart illustrating a blank paper removal processing routine.

The image reading apparatus 11 includes the control unit 50 that controls the same in an integrated manner. The control unit 50 includes a computer 60 constituted with a microprocessor or the like. The computer 60 includes a volatile memory 61 and a non-volatile memory 62 as an example of a storage unit. Various programs including a program PR illustrated in the flowchart of FIG. 13 are stored in the non-volatile memory 62. In addition, in the non-volatile memory 62, various table data such as a first management table SD1 (FIG. 5), a second management table SD2 (FIG. 7), and a blank paper determination table BT (FIG. 8) to which the computer 60 refers during the execution of the program PR, are stored.

In addition, the control unit 50 includes an input interface 63 (hereinafter, also referred to as "input IF63") that inputs various data and signals from the host apparatus 100, and an output interface 64 (hereinafter, also referred to as "output IF64") that outputs the reading data read by the image reading apparatus 11 to the host apparatus 100.

Further, the control unit 50 includes a timing generator 65 (hereinafter, also referred to as "TG65") that outputs a pulse signal that defines various operation timings including a readout operation with respect to the image sensors 42A and 42B. In addition, the control unit 50 includes an analog front end 66 (hereinafter, also referred to as "AFE66") that performs analog and digital conversion (A/D conversion) of pixel signals input from the image sensors 42A and 42B.

The computer 60 includes a main control unit 70, a transportation control unit 71, a reading control unit 72, and an image processing unit 73 as functional portions composed of software internally configured by executing various programs including the program PR. The main control unit 70 controls the image reading apparatus 11 in an integrated manner, and gives an instruction to each of the units 71 to 73. A portion of the functional units such as the image processing unit 73 may be configured by hardware.

The transportation control unit 71 drives and controls the feeding motor 37 and the transport motor 38 according to the instruction of the main control unit 70. By rotating the feeding roller 33 by driving the feeding motor 37, a bundle of the plurality of sheets of documents D (hereinafter, also referred to as "document bundle D") set on the document support 13 are fed into the main body 12 sequentially one sheet at a time from the lowest one. In addition, by driving the feeding motor 37, one driving roller 34A constituting the feeding roller pair 34 is rotationally driven, and by driving the transport motor 38, the other separation roller 34B is rotationally driven. In particular, the transportation control unit 71 drives and controls the feeding motor 37 and the transport motor 38 so that the document D is transported at a reading speed corresponding to the reading resolution (for example, 300 and 600 dpi) in the reading area SA in the middle of the transport path 29. For example, when the reading resolution is relatively low (for example, 300 dpi), the document D is transported at a high speed, and when the reading resolution is relatively high (for example, 600 dpi), the document D is transported at a low speed.

The reading control unit 72 controls the reading unit 40 via the TG 65, and causes the reading unit 40 to read the image of the document D. In particular, the reading control unit 72 outputs a pulse signal that defines the operation timing of various operations including the readout operation, to the TG 65 with respect to the image sensor 42, and controls the light emission of the light source 41 via a light source driving unit (not illustrated) to irradiate the reading area SA with light from the light source 41.

When the digital signal of the image read by the reading unit 40 is input via the AFE 66, the image processing unit 73 temporarily stores the image data based on the input digital signal, performs a known correction processing such as shading correction on the stored image data, and generates the image data of the document D. The image processing unit 73 performs various corrections such as gamma correction in addition to the shading correction, and outputs the corrected image data to the host apparatus 100 via a communication cable (not illustrated) via the output IF64.

FIG. 3 illustrates an image reading system. The image reading system 10 illustrated in FIG. 3 includes the image reading apparatus 11 and a host apparatus 100 as an example of an image reading control apparatus communicatively coupled to the image reading apparatus 11. When the document D is read by the image reading apparatus 11, the user can operate the input unit 21 of the image reading apparatus 11 to instruct the reading start, or can also operate the input unit 101 of the host apparatus 100 to instruct the reading start of the image reading apparatus 11.

Accordingly, the image reading control apparatus 110 included in the host apparatus 100 has a portion of the functions of the control unit of the image reading apparatus 11 in the same manner Specifically, the image reading control apparatus 110 includes a portion of functions among the functions configured by the software included in the control unit 50 of the image reading apparatus 11 in the same manner. For example, the image reading control apparatus 110 includes the function of the main control unit 70 in the control unit 50 of the image reading apparatus 11 in the same manner. The details of the image reading control apparatus 110 will be described later.

As illustrated in FIG. 3, the control unit 50 of the image reading apparatus 11 includes various functional portions composed of software configured by the computer 60 executing a program. For example, a portion of the main control unit 70 and the image processing unit 73 is composed of software.

As illustrated in FIG. 3, the main control unit 70 includes a display control unit 76, a blank paper removal setting unit 77, a blank paper removal level setting unit 78, and a preview setting unit 79. In addition, the image processing unit 73 includes an OCR 86 (optical type character recognition apparatus), a blank paper determination unit 87 as an example of a determination unit, and a data generation unit 88.

Figure 11:
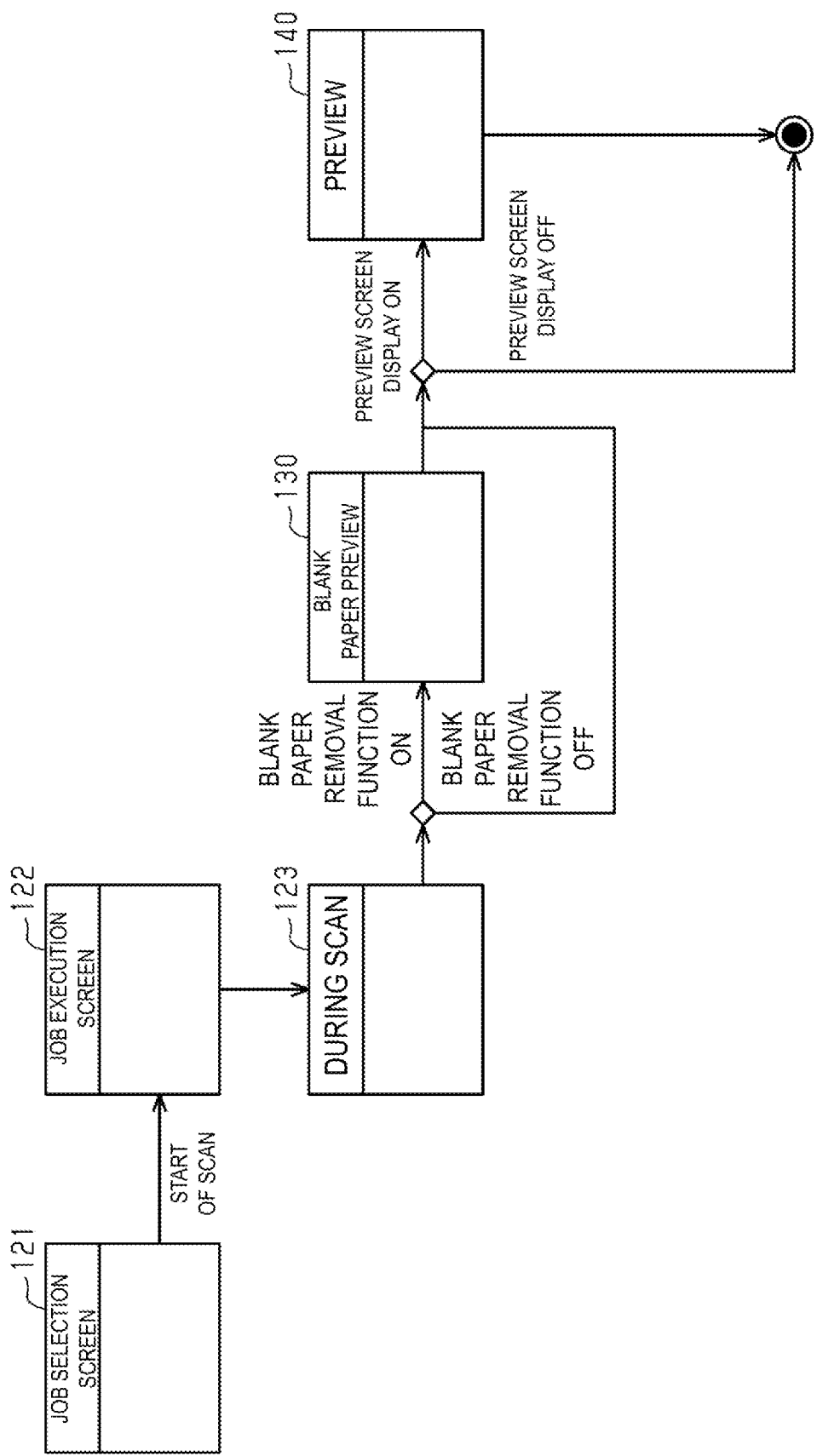
FIG. 11 is a flow diagram illustrating a transition of a screen.

In the present embodiment, the display control unit 76, the blank paper removal setting unit 77, the blank paper removal level setting unit 78 and the preview setting unit 79 in the main control unit 70, and further, an OCR 86, the blank paper determination unit 87, and the data generation unit 88 in the image processing unit 73 are configured by software. The functional portions composed of the software in the main control unit 70 are responsible for a setting function of setting a setting condition for displaying a blank paper preview screen 130 (FIG. 12), and a setting function of setting a setting condition for displaying a document preview screen 140 (FIG. 11). In addition, the functional portions of composed of the software in the image processing unit 73 are responsible for a display function for displaying the blank paper preview screen 130, and a display function for displaying the document preview screen 140.

Then, in the present embodiment, the blank paper preview screen 130 (FIG. 12) and the document preview screen 140 (FIG. 11) can be displayed on the display unit 102 even on the side of the host apparatus 100. The host apparatus 100 includes the image reading control apparatus 110 configured by software. The image reading control apparatus 110 is constituted with a computer 60 that executes a program installed in the host apparatus 100. The program may be a scanner driver program, or may be a program for enhancing the function of the image reading apparatus 11 different from the scanner driver program.

In the present embodiment, the display control unit 76 controls the display content of the display unit 22. When the user inputs an operation signal by operating the input unit 21, the display control unit 76 performs display control to display a setting screen corresponding to the operation signal on the display unit 22. The display control unit 76 displays various setting screens such as a job selection screen 121 (see FIG. 11) including, for example, a first setting screen 91 illustrated in FIG. 4, a second setting screen 92 illustrated in FIG. 6, or the like according to an operation signal from the input unit 21.

In addition, when the blank paper removal function that can be set on the first setting screen 91 is ON (enabled), the display control unit 76 displays the blank paper preview screen 130 (FIG. 12) that previews only the image of the blank paper determined to be blank paper among the images of the document bundle D read after the end of scan. Further, when the preview function that can be set on the first setting screen 91 is ON (enabled), the display control unit 76 displays the document preview screen 140 (see FIG. 11) that previews the image of the document bundle D read after the job is ended.

By operating the menu displayed on the display unit 22 on the touch panel to select a lower-level screen, the user can cause the job selection screen 121 (FIG. 11), the first setting screen 91 (FIG. 4), the second setting screen 92 (FIG. 6), or the like to be displayed. By selecting a selection item or the like by touch panel operation on the above-mentioned various screens displayed on the display unit 22, the user performs various settings including the setting of a reading condition, the blank paper preview function, enabling and disabling of the preview function, or the like.

When receiving an operation signal for selecting ON and OFF of the blank paper removal function on the first setting screen 91, the blank paper removal setting unit 77 sets ON and OFF of the blank paper removal function according to the operation signal.

When in the first setting screen 91 or the blank paper preview screen 130, the user operates a pointing device such as a mouse to select a desired numerical value from the settable range of the blank paper removal level and then inputs a signal of the gist to confirm the numerical value, to the input units 21 and 101, the blank paper removal level setting unit 78 sets the input numerical value as a blank paper removal level. In the operation of the input units 21 and 101, the user performs an operation of, for example, selecting a blank paper removal level "15" and confirming the selection. When receiving the numerical value "15" and the confirmation signal, the blank paper removal level setting unit 78 updates the setting of the blank paper removal level to "15". The numerical value of the blank paper removal level is a parameter that determines a threshold value used in the blank paper determination in which the blank paper determination unit 87 determines whether the image of the document D is a blank paper page when the blank paper removal function is ON.

The preview setting unit 79 sets ON and OFF of the preview screen display function of displaying the document preview screen 140 (see FIG. 11).

First Setting Screen 91

Figures 4, 5:
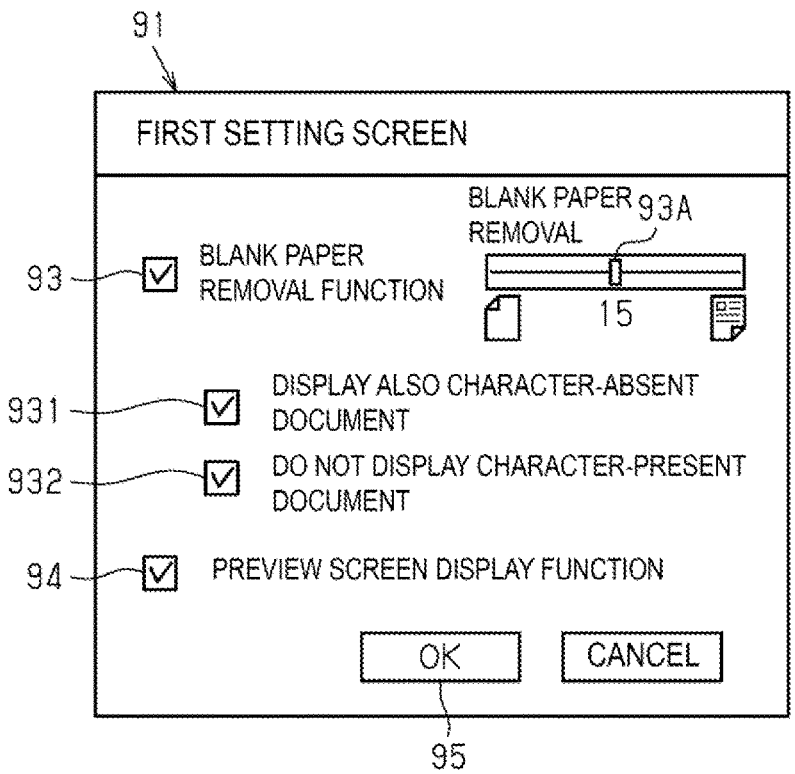
FIG. 4 is a diagram illustrating a first setting screen.
FIG. 5 is a diagram illustrating a first management table.

The first setting screen 91 illustrated in FIG. 4 is a setting screen for selecting ON and OFF of the blank paper removal function, setting a value of the blank paper removal level, and selecting ON and OFF of the preview screen display function. As illustrated in FIG. 4, the first setting screen 91 is provided with a selected unit 93 for selecting ON and OFF of the blank paper removal function, a first selected unit 931 for selecting to enable (ON) a character-absent document display function that can be selected when ON of the blank paper removal function is selected, and a second selected unit 932 for selecting to enable (ON) a character-present document non-display function. In addition, the first setting screen 91 is provided with a selected unit 94 for selecting to enable (ON) a preview screen display function. The blank paper removal function performs a blank paper determination to determine whether the image of the document bundle D that has been read is a blank paper document, removes the image of the blank paper document when an image of the blank paper document is included, and then generates a file of the scan result. Accordingly, when the user wants to automatically remove the image of the blank paper document when the document bundle D includes the blank paper document, the blank paper removal function is enabled (ON) by selecting the selected unit 93.

The first setting screen 91 is provided with a slider 93A as an operation unit in which the blank paper removal level can be selected by a slide operation. When the blank paper removal function is enabled, the user can adjust the value of the blank paper removal level by slidingly operating the slider 93A. In this example, a value from 0 to 30 is prepared for the blank paper removal level, and the user sets one value from the values within the range. In the example illustrated in FIG. 4, the blank paper removal level is set to "15". For example, for pure white paper, the blank paper removal level is set to a lower value, and for colored paper or recycled paper, the blank paper removal level is set to a higher value than for pure white paper.

In addition, when the blank paper removal function is ON, the blank paper preview screen 130 (FIG. 12) is displayed in which the image of the document D of a blank paper removal candidate, which is removed as blank paper after the end of scan, is previewed. When the user confirms the image of the blank paper removal candidate in the blank paper preview screen 130 and there is an image that the user does not want to remove as blank paper, it is possible to switch from the blank paper removal candidate to the non-removal candidate. In the present embodiment, in the default setting of the blank paper preview screen 130, the image of the character-absent document is not preview-displayed as a blank paper removal candidate although it is determined to be blank paper, and the character-present document is preview-displayed as a blank paper removal candidate when it is determined to be blank paper.

However, there is a user who wants to confirm whether the character-absent document may also be removed as blank paper. In addition, when the image can be clearly removed as a blank paper document without a problem even for the character-present document, confirmation is not required, and thus some users do not want to display the image on the blank paper preview screen 130. Accordingly, the first setting screen 91 illustrated in FIG. 4 is provided with the selected unit 931 for selecting ON and OFF of the "character-absent document display function" that also displays a character-absent document. In addition, the first setting screen 91 is provided with the selected unit 932 for selecting ON and OFF of the "character-present document non-display function" that the character-present document is not displayed.

In addition, when the selected unit 94 of the preview screen display function is ON, the document preview screen 140 (FIG. 11) is displayed in which the images of all the documents are previewed after the job is ended. On the document preview screen 140, the user can confirm the image quality and color of the reading image, the presence or absence of an unnecessary blank paper document, or the like. For example, when an unnecessary blank paper document is included, the user can remove the image of the unnecessary blank paper document by operating on the document preview screen 140.

After finishing the selection of the selected unit, the setting of the blank paper removal level, and the selection of the preview screen display function on the first setting screen 91, when the user operates an OK button 95, those setting contents are registered. The registration of the setting contents is performed by the setting units 77 to 79 that input the ON and OFF information for each selected unit when the OK signal is input.

Each of the setting units 77 to 79 manages the registered setting contents by the first management table SD1 illustrated in FIG. 5. As illustrated in FIG. 5, the first management table SD1 manages ON and OFF of the blank paper removal function, and when the blank paper removal function is ON, ON and OFF of the character-absent document display function and ON and OFF of the character-present document non-display function are managed. In addition, when the blank paper removal function is OFF, both the character-absent document display function and the character-present document non-display function are OFF. In addition, the selected one of ON and OFF of the preview screen display function is managed. For example, when the OK button 95 is operated with the setting contents of the first setting screen 91 illustrated in FIG. 4, all four functions of the first management table SD1 are ON.

Based on the setting contents of the setting units 77 to 79, the main control unit 70 refers to the first management table SD1 illustrated in FIG. 4 stored in the non-volatile memory 62, and manages the presence and absence of a blank paper removal function, the presence and absence of the character-absent document display function, the presence and absence of the character-present document non-display function, and the presence and absence of the preview screen display function. As for the selected units 931 and 932 and the slider 93A related to the blank paper removal function on the first setting screen 91 of FIG. 4, the same function is provided on the blank paper preview screen 130 (FIG. 12), and thus, all or a portion thereof may be abolished.

Second Setting Screen

The second setting screen will be described with reference to FIG. 6. The second setting screen 92 illustrated in FIG. 6 is a setting screen for selecting one of four types of settings such as normal scan, AFM job, continuous job, and AFM and continuous job, and enabling the selected one scan format. Here, the AFM is an abbreviation for auto feeding mode. When the AFM is enabled (ON), when a document bundle composed of the plurality of documents D is set in the support, the scan of the document D is automatically started with the set detection as a trigger. The continuous job is a scan mode selected when there are a plurality of sets of document bundles and the sets are wanted to be read as one file. With the continuous job being enabled, when the document D is set in the document support 13, the job is executed to perform reading, and then when the next document D is set in the document support 13, the next document bundle is scanned. A plurality of sets of document bundles read by the continuous scan are read as one file. When both the AFM and the continuous job are selected, the AFM and continuous job is a scan mode that combines the functions of both the AFM and the continuous job.

On the second setting screen 92, for example, selected units 96 to 98 including, for example, checkboxes that can individually check the normal scan, the AFM, and the continuous job are prepared. That is, the second setting screen 92 is provided with the selected unit 96 for selecting the normal scan, a selected unit 97 for selecting the AFM, and the selected unit 98 for selecting the continuous job. The user can select both the selected units 97 and 98 of the AFM and the continuous job at the same time, and by selecting both of them, both modes are enabled and the AFM and continuous job mode is set. By operating the input unit 21 of the image reading apparatus 11 or the input unit 101 of the host apparatus 100, the user can individually select and set each mode of the normal scan, the AFM, the continuous job, and the AFM and continuous job. When the OK button 99 is selected on the second setting screen 92, one mode corresponding to the scan format selected on the second setting screen 92 is set.

Second Management Table

Next, the second management table SD2 illustrated in FIG. 7 will be described. The second management table SD2 manages the blank paper preview screen display timing and the timing for reflecting the blank paper removal level changed on the blank paper preview screen 130 (FIG. 12) for each scan format.

Based on the scan format selected on the second setting screen 92, the computers 60 and 120 refer to the second management table SD2 to acquire the display timing for displaying the blank paper preview screen 130. In addition, based on the scan format selected on the second setting screen 92, the computers 60 and 120 refer to the second management table SD2 to acquire the reflection timing that reflects the setting value of the blank paper removal level.

As illustrated in FIG. 7, in the case of the normal scan, the blank paper preview screen 130 is displayed "after the job is ended", and the setting value of the changed blank paper removal level is reflected "from the next scan job". In the case of the AFM, the blank paper preview screen 130 is displayed "after the scan of the document bundle is completed", and the setting value of the changed blank paper removal level is reflected "from the scan of the next document bundle". In the case of the continuous job, the blank paper preview screen 130 is displayed "after the scan of the document bundle is completed", and the setting value of the changed blank paper removal level is reflected "from the scan of the next document bundle". Further, in the case of the AFM and continuous job, the blank paper preview screen 130 is displayed "after the scan of the document bundle is completed", and the setting value of the changed blank paper removal level is reflected "from the scan of the next document bundle".

In the present embodiment, when the blank paper removal function is ON, the display control unit 76 causes the blank paper preview screen 130 (FIG. 12) to be displayed on the display units 22 and 102 when the display timing responding to the scan format at that time is reached. In addition, when the slider 133A (see FIG. 12), which will be described later, is slidingly operated on the blank paper preview screen 130 by the operation of the input units 21 and 101 to change the setting value of the blank paper removal level, and then the completion button 138 is operated, the setting value of the blank paper removal level after the change is confirmed. After the confirmation, when the setting value reflection timing of the blank paper removal level according to the scan format is reached, the confirmed and changed blank paper removal level is reflected as the setting value.

The blank paper removal level setting unit 78 illustrated in FIG. 3 inputs the coordinate value of the adjustment position when the user operates the input units 21 and 101 on the first setting screen 91 and the blank paper preview screen 130 to adjust the blank paper removal level, as an operation signal of the input units 21 and 101, and acquires the setting value of the adjusted blank paper removal level from the value corresponding to the input coordinate value. When receiving an operation of confirming the value after acquiring the blank paper removal level, the blank paper removal level setting unit 78 updates the blank paper removal level setting.

As illustrated in FIG. 8, in the blank paper determination table BT, for example, 30 step levels from "1" to "30" are set as the blank paper removal level. The blank paper removal level is a setting value that determines a threshold value when the image of the document D is removed as a blank paper page. For example, when the blank paper removal level is "1" and there is any color in the background color, it is removed as a blank paper page. For example, for the document D having a pure white background color, a small value is set for the blank paper removal level. In addition, for the document D having a background color such as light gray color, light red color, light blue color, or cream color, a larger value is set for the blank paper removal level than the document D having a pure white background color. In addition, since the recycled paper may contain fine paper fibers or the like having a color denser than the background color, a larger value is set for the blank paper removal level than the document D having a pure white background color. By adjusting the value of the blank paper removal level according to the background color and the paper quality of the document D, the user performs setting so that, for example, only the unprinted blank paper document is removed as a blank paper page. Accordingly, it is possible to avoid the inconvenience that even a blank paper document is not removed as a blank paper page, or the document D with a very small amount of printing is not removed as a blank paper page. The blank paper removal level is not limited to 30 steps, but may be 10 steps, 20 steps, 50 steps, or the like, may be 2 steps, 5 steps, or the like, and depending on user needs and the blank paper removal accuracy required for the image reading apparatus 11, the number of levels can be set as appropriate.

In the blank paper determination table BT illustrated in FIG. 8, a threshold value PS0 is set for each blank paper removal level. The blank paper determination unit 87 performs a blank paper determination using the threshold value PS0 responding to the blank paper removal level set by the user. The threshold value PS0 is a value that becomes larger as the value of the blank paper removal level becomes larger. When a print area pixel number PN, which is the number of pixels of a print area PA in a histogram HD, is equal to or less than the threshold value PS0 (PN<PS0), the blank paper determination unit 87 determines that it is a blank paper page. On the other hand, when the print area pixel number PN exceeds the threshold value PS0 (PN>PS0), the blank paper determination unit 87 determines that it is not a blank paper page.

Configuration of Image Processing Unit

Figure 9:
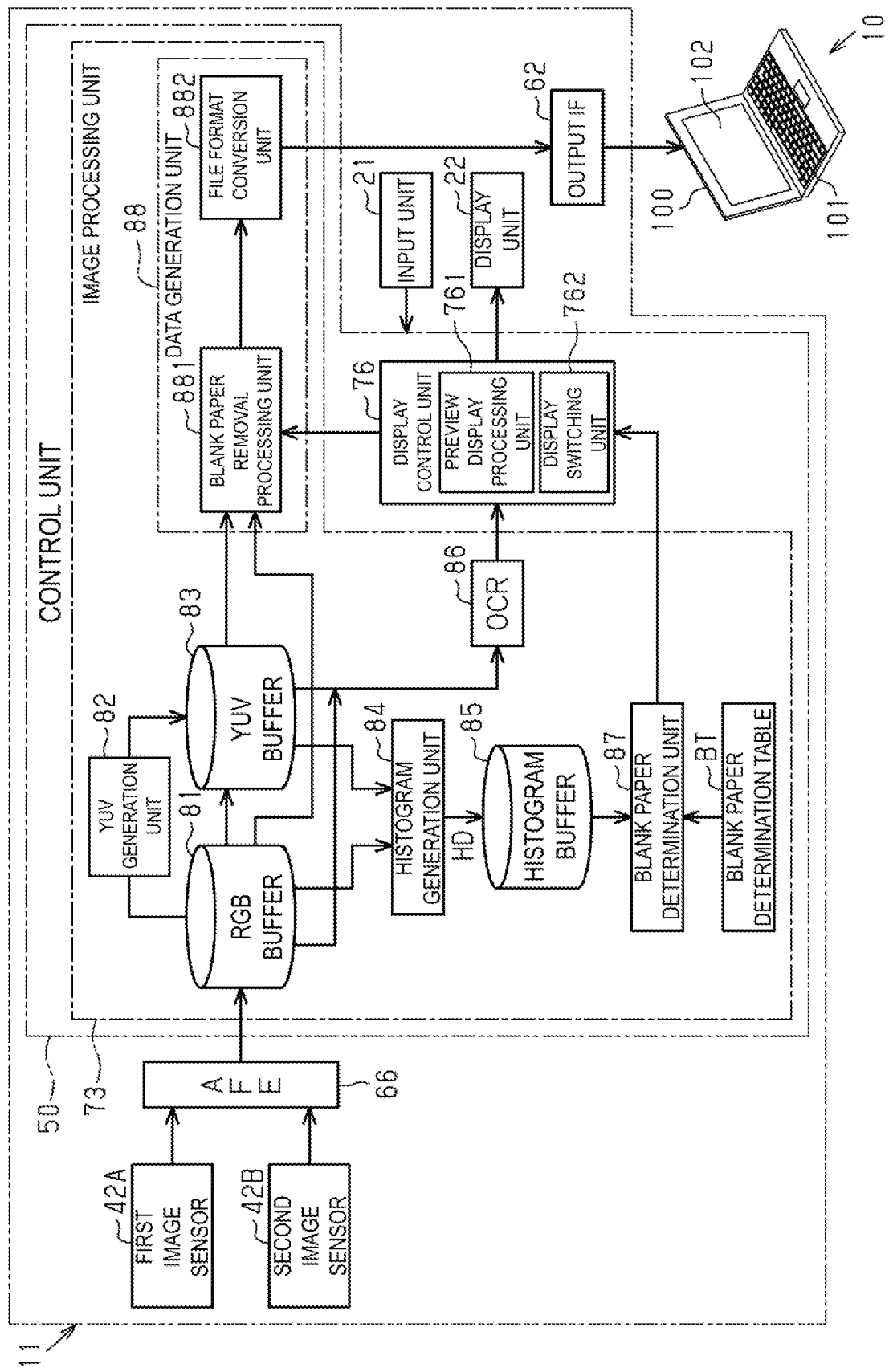
FIG. 9 is a block diagram illustrating a detailed configuration of an image processing unit.

Next, a detailed configuration of the image processing unit 73 will be described with reference to FIG. 9. Although FIG. 9 illustrates the image processing unit 73 in the image reading apparatus 11, the configuration of the software portion of the image processing unit 73 is included also in the image reading control apparatus 110 in the host apparatus 100 in the same manner.

The image processing unit 73 includes an RGB buffer 81, a YUV generation unit 82, a YUV buffer 83, a histogram generation unit 84, and a histogram buffer 85.

The image processing unit 73 acquires the reading data obtained by reading the document D by the first image sensor 42A and the second image sensor 42B constituting the reading unit 40 as RGB data via the AFE 66. The image processing unit 73 stores the RGB data in the RGB buffer 81. That is, the image processing unit 73 inputs the reading data read by the reading unit 40 from the document D as a digital signal from the AFE 66, and stores the RGB format image data based on the digital signal in the RGB buffer 81.

The YUV generation unit 82 generates YUV data from the RGB data read out from the RGB buffer 81. The YUV generation unit 82 stores the generated YUV data in the YUV buffer 83. That is, the YUV generation unit 82 generates the YUV format image data from RGB format image data and stores the YUV format image data in the YUV buffer 83.

Figure 10:
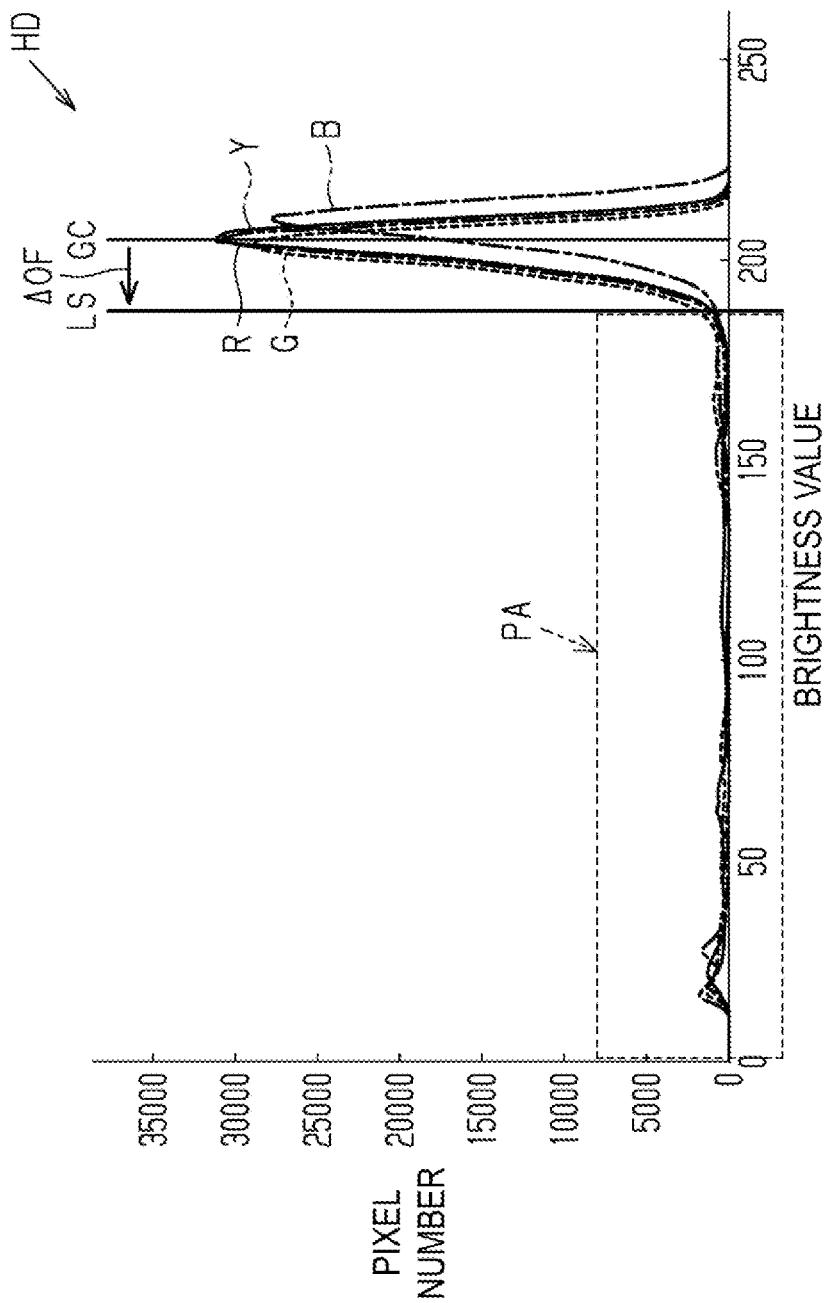
FIG. 10 is a graph illustrating a histogram used for the determination of a blank paper document.

The histogram generation unit 84 acquires RGB data from the RGB buffer 81, acquires Y data from the YUV buffer 83, and generates the histogram HD of RGBY four colors (see FIG. 10). The histogram generation unit 84 temporarily stores the data of the histogram HD of RGBY four colors in the histogram buffer 85.

Further, the image processing unit 73 illustrated in FIG. 9 includes the display control unit 76, the OCR 86, the blank paper determination unit 87, and the data generation unit 88 as software portion that the image reading control apparatus 110 also includes in the same manner. The display control unit 76 includes a preview display processing unit 761 and a display switching unit 762. In addition, the data generation unit 88 includes a blank paper removal processing unit 881 and a file format conversion unit 882. When the display control unit 76, the OCR 86, the blank paper determination unit 87, and the data generation unit 88 operate in the image reading apparatus 11, the processing proceeds according to the data flow illustrated in FIG. 9. On the other hand, when operating in the image reading control apparatus 110, necessary data including the image data of the document D read by the image reading apparatus 11 is transmitted from the image reading apparatus 11 to the image reading control apparatus 110 in the host apparatus 100. Then, the display control unit 76, the OCR 86, the blank paper determination unit 87, and the data generation unit 88 in the image reading control apparatus 110 perform processing similar to that of the display control unit 76, the OCR 86, the blank paper determination unit 87, and the data generation unit 88 in the image processing unit 73 in FIG. 9, based on necessary data including the image data received from the image reading apparatus 11.

Which of the image reading apparatus 11 and the image reading control apparatus 110 performs the processing described above is determined according to which of the input unit 21 of the image reading apparatus 11 and the input unit 101 of the host apparatus 100 the user operates to execute the job. In the latter case, the image data obtained by reading the document bundle D and the data of the histogram HD are transmitted to the host apparatus 100 via the output IF64. The image data is transmitted in the state before the blank paper is removed. The image data may be RGB image data, YUV image data, or image data compressed in a predetermined file format. The image data may be configured to generate a blank paper preview screen 130, generate a document preview screen 140, and finally generate a file having a predetermined file format in the output conditions specified by the user. When the histogram generation unit 84 is software, the image reading control apparatus 110 may have the histogram generation unit 84. In this case, the image reading control apparatus 110 may generate the histogram HD by the own histogram generation unit 84 using the image data received from the image reading apparatus 11.

In addition, the image reading control apparatus 110 temporarily stores the image data or the like received from the image reading apparatus 11 in a buffer. The image reading control apparatus 110 uses an area of a portion of the memory that the computer 120 in the host apparatus 100 has, as a buffer similar to that illustrated in FIG. 9. That is, the image reading control apparatus 110 has the RGB buffer 81 similar to that illustrated in FIG. 9 when receiving RGB image data, has the YUV buffer 83 similar to that illustrated in FIG. 9 when receiving YUV image data, and further has the histogram buffer 85 similar to that illustrated in FIG. 9 for temporarily storing the data of the received or generated histogram HD. Accordingly, in the image reading control apparatus 110, the data flow when each of the display control unit 76, the OCR 86, the blank paper determination unit 87, and the data generation unit 88 is activated and each performs processing is as illustrated in FIG. 9. The image reading control apparatus 110 includes a buffer (not illustrated) that stores a file of a predetermined file format generated by the file format conversion unit 882. In the buffer, a file received from the image reading apparatus 11 and a file generated by the file format conversion unit 882 in the image reading control apparatus 110 are stored.

Hereinafter, the function of each portion composed of software commonly provided in the image reading apparatus 11 and the image reading control apparatus 110 will be described in detail.

The OCR 86 extracts characters from the image data of the document D read by the reading unit 40, that is, the RGB image data read out from the RGB buffer 81 or the YUV image data read out from the YUV buffer 83, and performs processing of converting the extracted characters to text data. Accordingly, the OCR 86 has a character recognition function of recognizing characters (text) in image data, and a character code conversion function of converting characters recognized by the character recognition function into text data (character code). In the blank paper removal processing of the present embodiment, the character recognition function among the plurality of functions of the OCR 86 is used. The character recognition result information that the OCR 86 has obtained in the character recognition processing is sent to the display control unit 76.

The blank paper determination unit 87 illustrated in FIGS. 3 and 9 determines whether each document sheet is a blank paper page based on the image data of the document D. Based on the image data of the read document D, the blank paper determination unit 87 determines that an image that satisfies the blank paper removal level of the blank paper removal function is a blank paper removal candidate, and determines that an image that does not satisfy the blank paper removal level is a non-removal candidate. The blank paper determination unit 87 performs a blank paper determination that considers an image of the document D in which the number of pixels having a predetermined density such as characters in the document is equal to or less than a threshold value corresponding to a setting value of the blank paper removal level, as a blank paper document. The blank paper determination unit 87 refers to the blank paper determination table BT illustrated in FIG. 8 and acquires the threshold value PS0 responding to the blank paper removal level set at that time. For example, in the blank paper determination table BT illustrated in FIG. 8, when the current blank paper removal level is "15", the blank paper determination unit 87 acquires the threshold value PS0=10000 responding to the blank paper removal level "15".

The blank paper determination unit 87 illustrated in FIGS. 3 and 9 calculates the print area pixel number PN, which is the number of pixels in the print area PA defined as a density area having a high density equal to or higher than a predetermined density of the background color of the document D, by using a histogram of RGBY four colors in the image data of the document D. When the print area pixel number PN is equal to or less than the threshold value PS0 (PN<PS0), the blank paper determination unit 87 determines that the document is a blank paper page. On the other hand, when the print area pixel number PN exceeds the threshold value PS0 (PN>PS0), the blank paper determination unit 87 determines that the document is not a blank paper page.

Histogram

Here, a blank paper determination method performed by the blank paper determination unit 87 using the histogram HD will be described with reference to FIG. 10. The histogram generation unit 84 illustrated in FIG. 9 generates the histogram HD illustrated in FIG. 10 for each page based on the reading data SD for each document sheet. The histogram generation unit 84 generates the histogram HD of RGBY four colors described above illustrated in FIG. 10. The horizontal axis of the histogram HD in FIG. 10 is a brightness value, and, for example, takes a value from 0 to 255 in 256 gradations. In addition, the vertical axis of the histogram HD is the number of pixels.

In the histogram HD for each page based on the reading data for each document sheet, the peak of RGBY four colors appear around the brightness value from 180 to 230, which represents the background color of the paper of the document D. The background color is, for example, white, light gray color, cream color, light blue, light red color, or the like.

In the one-page histogram HD based on the reading data of the normal document D on which characters and images are printed, in addition to the peak appearing in the brightness value according to the background color of the paper of the document D, pixels of the printed portion such as text and images appear in the area whose brightness value is smaller than the threshold value of the brightness value which is smaller by a predetermined offset amount than the peak of the background color.

Next, with reference to FIG. 10, a determination method in which the blank paper determination unit 87 determines that the document D is a blank paper document will be described. When the document D is a blank paper document, the histogram HD illustrated in FIG. 10 has only a peak of the background color, and there are almost no pixels having a brightness value in the print area PA whose brightness value is lower than the peak of the background color.

Characters and images are printed on the normal document D in a color denser than the background color of the paper. As illustrated in FIG. 10, the area of the brightness value that can be taken by the print pixels of characters, images, or the like is defined as the print area PA. The print area PA is an area that is equal to or less than a brightness threshold value LS that is a value offset to the side whose brightness value is lower by a predetermined offset amount ΔOF (left side in FIG. 10) from a brightness value GC of the background color indicated by the brightness value of the peak of the RGBY four colors representing the peak of the background color of the document D. That is, the print area PA is an area in the range of the brightness value from 0 to LS.

When the document is blank paper, there are no or very few pixels having a brightness value in the print area PA. The blank paper removal level is an index indicating the degree of smallness of the print area pixel number PN, which is the number of pixels in the print area PA. Accordingly, the threshold value PS0 corresponding to the blank paper removal level is set in the blank paper determination table BT. Then, when the print area pixel number PN is equal to or less than the threshold value PS0 corresponding to the blank paper removal level, the blank paper determination unit 87 determines that the image of the document D is a blank paper page. Accordingly, the blank paper determination unit 87 of the present embodiment specifies the print area PA from the histogram HD of the image data of the document D based on the brightness value GC of the background color, counts the print area pixel number PN that is the number of pixels in the specified print area PA, and determines whether the print area pixel number PN is equal to or less than the threshold value PS0 according to the blank paper removal level. Then, the blank paper determination unit 87 determines that the document is blank paper when the print area pixel number PN is equal to or less than the threshold value PS0, and determines that the document is not blank paper when the print area pixel number PN is not equal to or less than the threshold value PS0. The blank paper determination result is used to generate the blank paper preview screen 130 (FIG. 12), which will be described later. Accordingly, the blank paper determination result information performed by the blank paper determination unit 87 for the image data of the document D for each page is sent to the display control unit 76. For example, since a position of the peak (pixel value) GC is different for each color, the upper limit value of the print area PA is also different for each color. In the present embodiment, the offset amount ΔOF is a common value for each color, but a different offset amount ΔOF may be set for each color.

When the image reading apparatus 11 executes one job, the display control unit 76 performs display control to display various screens before the start of scan until the end of the job. For example, the display control unit 76 displays the blank paper preview screen 130 (see FIG. 12) on the display units 22 and 102 at the end of scan when the blank paper removal function is ON, and displays the document preview screen 140 on the display units 22 and 102 at the job end time when the preview screen display function is ON.

Display Screen Transition

Here, with reference to FIG. 11, the transition of the screen to be displayed on the display units 22 and 102 by the display control unit 76 will be described. Before executing and during executing one job, the job selection screen 121, a job execution screen 122, and a scanning screen 123 are displayed on the display units 22 and 102 in this order. The job selection screen 121 is a screen for selecting a job. On the job selection screen 121, a reading condition such as a reading resolution and a reading color such as color, gray scale, monochrome, and an output condition including a file format or the like desired by the user, are set. In addition, the first setting screen 91 and the second setting screen 92 are included as lower-level screens of the job selection screen 121. Accordingly, the selection of the scan format, ON and OFF of the blank paper removal function and ON and OFF of the preview display function, or the like are set on the job selection screen 121 and the lower-level screens thereof. When the setting conditions of the job are confirmed, the process transitions to the job execution screen 122. A scan start button (not illustrated) is displayed on the job execution screen 122, and the user instructs the image reading apparatus 11 to start scanning by the operation of the scan start button, for example, by operating the touch panel. During executing the scan, the scanning screen 123 informing the gist in which the scan is in progress is displayed on the display units 22 and 102.

The blank paper preview screen 130 and the document preview screen 140 (hereinafter, also simply referred to as the "preview screen 140") are displayed at a predetermined display timing after the end of scan when the respective display functions are enabled. That is, when the scan is ended, the blank paper preview screen 130 is displayed when the blank paper removal function is ON, and the blank paper preview screen 130 is not displayed when the blank paper removal function is OFF. In addition, when the job is ended, the preview screen 140 is displayed when the preview screen display function is ON, and the preview screen 140 is not displayed when the preview screen display function is OFF. When both the blank paper removal function and the preview screen display function are ON, the blank paper preview screen 130 is displayed in preference to the preview screen 140.

The display control unit 76 illustrated in FIG. 9 includes the preview display processing unit 761 described above as a processing unit that performs display processing of displaying the blank paper preview screen 130 and the preview screen 140. In addition, the display control unit 76 includes the display switching unit 762 described above as a processing unit that switches the display mode of the selected image to a selected state in which the blank paper removal candidate or the non-removal candidate is selected after the user performs an operation of selecting an image wanted to be a blank paper removal candidate or an image wanted to be a non-removal candidate among the images previewed on the blank paper preview screen 130.

First, the preview display processing unit 761 illustrated in FIG. 9 will be described. The preview display processing unit 761 preview-displays at least a portion of the image among the images of the read document D in a selectable state on the display units 22 and 102. In this example, the preview display processing unit 761 displays the blank paper preview screen 130 that previews at least a portion of the image determined as a blank paper removal candidate by the blank paper determination unit 87 among the images of the document D, on the display units 22 and 102. The preview display processing unit 761 generates screen data for displaying the blank paper preview screen 130. The preview display processing unit 761 acquires a blank paper determination result from the blank paper determination unit 87, and specifies an image BP (see FIG. 12) of the blank paper removal candidate based on the blank paper determination result. The preview display processing unit 761 generates screen data by reading out the image data of the blank paper removal candidate from the image data of the document D stored in the buffers 81 and 83, generating the low resolution image data of the blank paper removal candidate from the image data of the blank paper removal candidate that has been read out, and performing screen generation processing including processing of incorporating the low resolution image data into the display area of the screen. Then, the preview display processing unit 761 causes the display units 22 and 102 to display the blank paper preview screen 130 illustrated in FIG. 12 based on the screen data. A portion of the images such as the image of the character-absent document or the image of the character-present document when a character-present document non-display mechanism is enabled, are not included in the preview image although the images are the blank paper removal candidates.

Blank Paper Preview Screen

Here, the blank paper preview screen 130 will be described with reference to FIG. 12.

Figure 12:
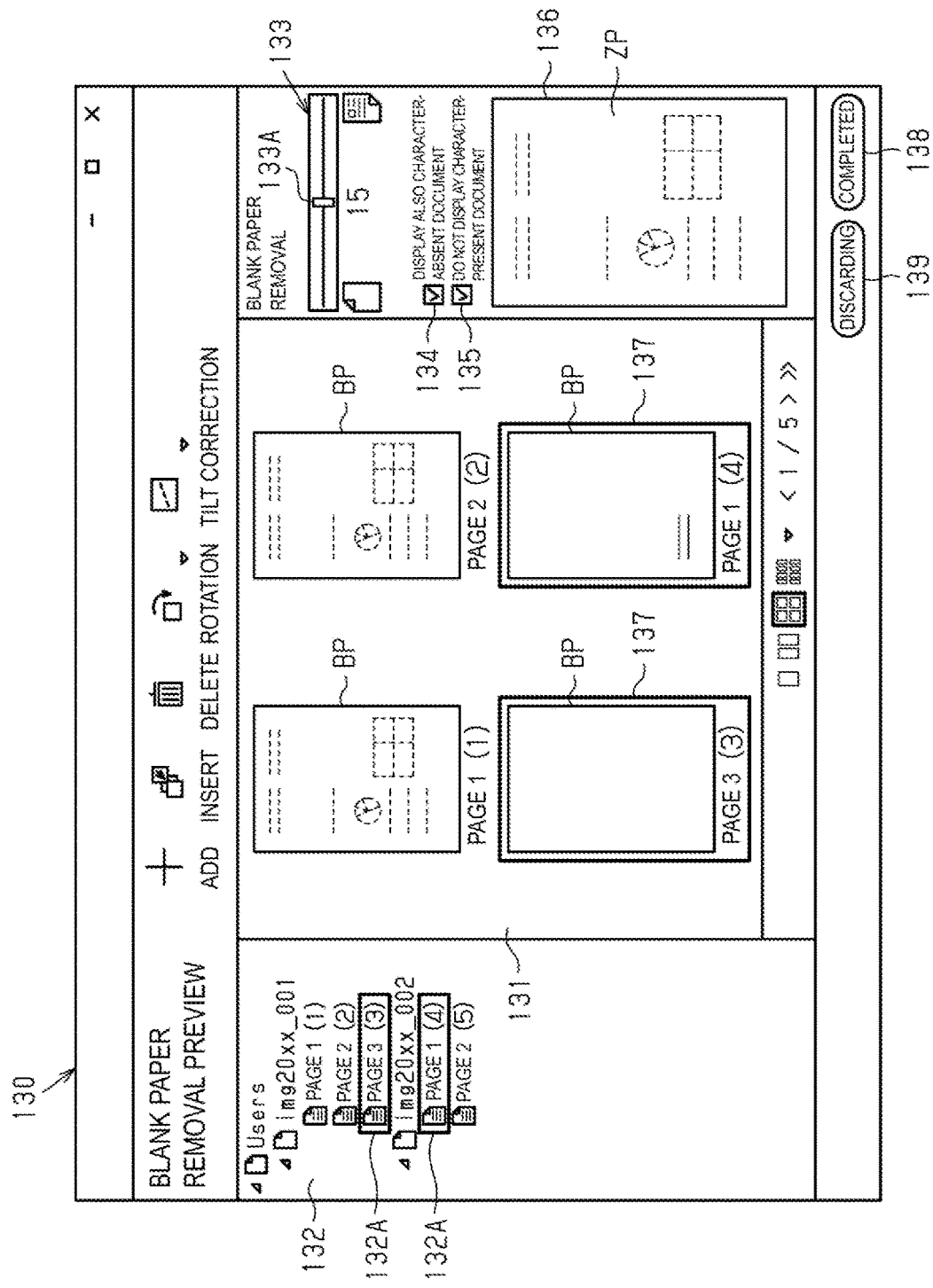
FIG. 12 is a diagram illustrating a blank paper preview screen.

The blank paper preview screen 130 illustrated in FIG. 12 is displayed on the display units 22 and 102 at the predetermined display timing described above after the end of scanning the document D. The blank paper preview screen 130 is a setting screen in which the user can see a blank paper page, which is the image of a blank paper removal candidate determined to be a blank paper document among the images of the scan result, as a preview image, and can operate to change the setting value of the blank paper removal level when the image BP of the blank paper removal candidate is confirmed. In this manner, the blank paper preview screen 130 is a setting screen used by the user to see the image BP of the blank paper removal candidate and change the setting value of the blank paper removal level.

Accordingly, the blank paper preview screen 130 is displayed at a predetermined timing after the end of scan. Specifically, there are two display timings of the blank paper preview screen 130 according to the scan format. When the continuous paper feeding mode, in which the document bundle D of one job is divided into a plurality of times, is set in the document support 13, and can be scanned, is executed, the blank paper preview screen 130 is displayed every time the scan of the document D set once is ended. In the other one, the blank paper preview screen 130 is displayed at the timing of the job end time. Accordingly, when the continuous paper feeding mode, for continuously reading documents of one job as one job when the documents are divided and set a plurality of times, is executed, the blank paper removal level can be changed even in the middle of the job at the timing at which reading the document set once finishes. In the present embodiment, these two timings may be collectively referred to as "at the end of scan".

As illustrated in FIG. 12, the blank paper preview screen 130 includes a preview display area 131 in which the image BP of the blank paper removal candidate is displayed in preview, and a page information display unit 132 that displays page information related to the image of the blank paper removal candidate. In addition, the blank paper preview screen 130 includes a removal level adjusting unit 133 configured to adjust the blank paper removal level. The removal level adjusting unit 133 includes a slider 133A as an operation unit configured to be operated on the screen by input operations of the input units 21 and 101. That is, the removal level adjusting unit 133 includes the slider 133A that is slidingly operated to a position corresponding to the value of the blank paper removal level. By slidingly operating the slider 133A by the operation of the input units 21 and 101, the value of the blank paper removal level can be adjusted according to the position that has been slid. In the example illustrated in FIG. 12, when the slider 133A is slidingly operated to the left direction, the value of the blank paper removal level becomes small, and on the other hand, when the slider 133A is slidingly operated to the right direction, the value of the blank paper removal level becomes large.

In addition, the blank paper preview screen 130 includes a first selected unit 134 configured to be selected to display an image of a character-absent document as a blank paper removal candidate, and a second selected unit 135 configured to be selected not to display a character-present document as a blank paper removal candidate. The first selected unit 134 and the second selected unit 135 are, for example, checkboxes, but may be display components such as radio buttons, pull-down type selection units, and push buttons.

Further, the blank paper preview screen 130 includes an enlarged display unit 136 in which an image selected from the images BP of the blank paper removal candidates is enlarged and displayed. One of the images BP of the blank paper removal candidates displayed in the preview display area 131 is in the selected state by being selected by the operation of the input units 21 and 101 by the user, and an enlarged image ZP of the image BP of the blank paper removal candidate in the selected state is displayed on the enlarged display unit 136. In addition, the preview display processing unit 761 displays the removal level adjusting unit 133 configured to adjust the blank paper removal level on the display units 22 and 102.

Figure 16:
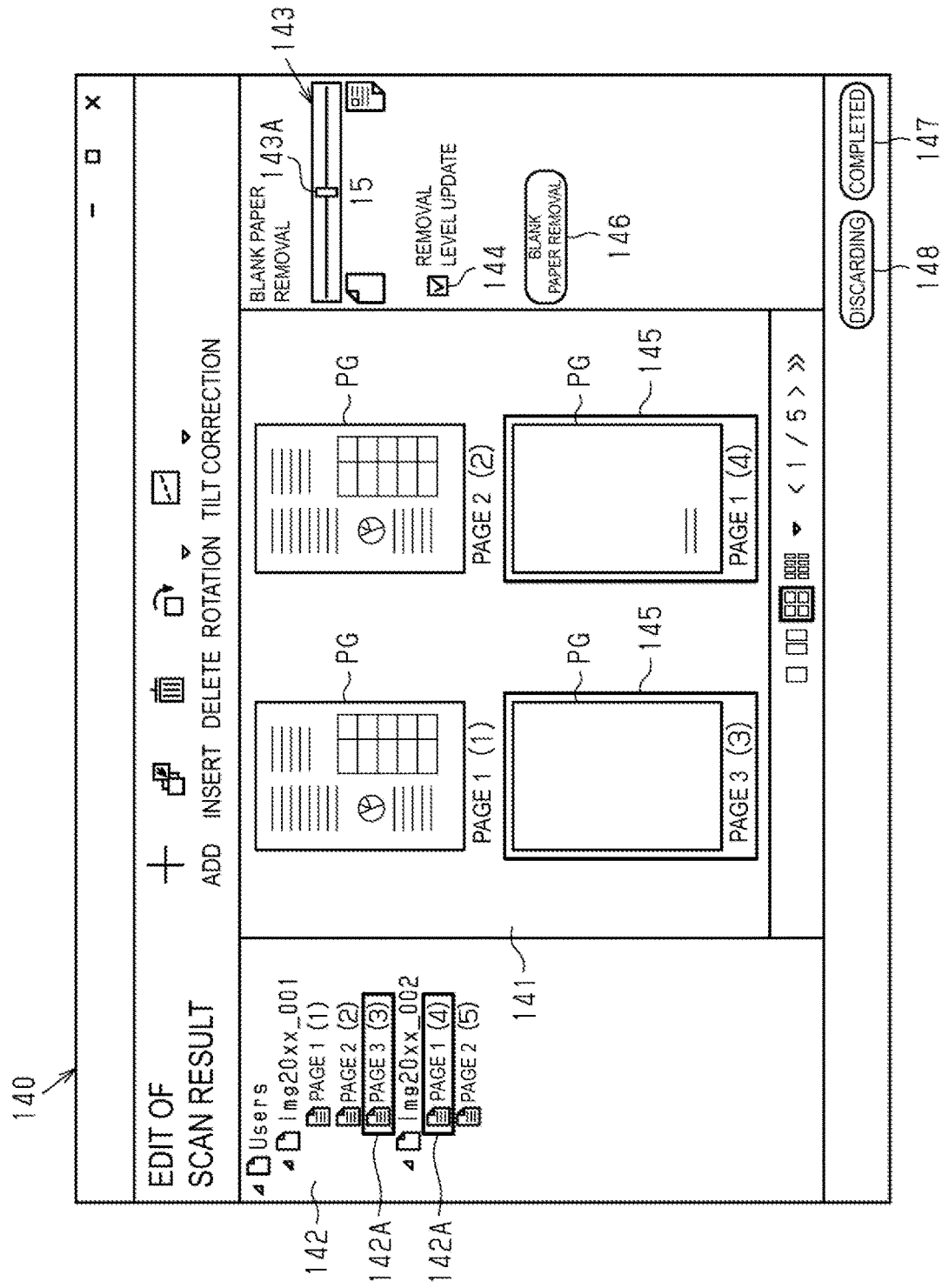
FIG. 16 is a diagram illustrating a document preview screen according to a second embodiment.

The preview display processing unit 761 displays both the image BP and the removal level adjusting unit 133 in a state in which both are disposed to be visually recognizable on the blank paper preview screen 130 illustrated in FIG. 16, on the display units 22 and 102. The user can confirm the change in the display of the image BP of the blank paper removal candidate when operating the removal level adjusting unit 133 on the blank paper preview screen 130, and can adjust the blank paper removal level appropriately.

In addition, when the image BP of the blank paper removal candidate is selected by the touch operation by the input unit 21 or a pointing device such as a mouse constituting the input unit 101, the image BP is highlighted. In the example illustrated in FIG. 12, the images BP of the selected page 3 and page 4 are highlighted by a highlighting unit 137 composed of a highlighting frame that individually surrounds the images BP. For example, the highlighted image BP is an image selected by the user as a blank paper removal target. When the user selects the image BP as a blank paper removal target, the selected image BP is highlighted by the first highlighting unit 137, and the page information in the page information display unit 132 responding to the selected image BP is highlighted by a second highlighting unit 132A such as a display frame surrounding the page information. Accordingly, the user can confirm at a glance the image BP selected as the blank paper removal target among the images BP of the blank paper removal candidates and the page information thereof.

Here, a configuration may be such that by providing a selected unit (not illustrated) that sets all the images BP of the blank paper removal candidates in a selected state and by selecting a non-removal candidate from all the images BP in a selected state and canceling the highlighting state, the image of the highlighted non-removal candidate may be selected. In this manner, by the operation of selecting the image BP of the blank paper removal candidate by the operation of the input units 21 and 101, the switching operation of switching the display mode of the image BP to a selected state in which the blank paper removal candidate or the non-removal candidate is selected, is performed. The blank paper preview screen 130 includes a display image number selection function of allowing the number of images BP displayed in the preview display area 131 to be selected, and a page-turning function of moving the pages of the preview display area 131 back and forth.

In addition, the blank paper preview screen 130 includes a completion button 138 and a discarding button 139. The user confirms the image BP of the blank paper removal candidate previewed on the blank paper preview screen 130, operates the input units 21 and 101 according to the need to switch the display of the blank paper removal candidate and the non-removal candidate of the image BP, and causes the blank paper removal candidate and the non-removal candidate of the image to be in a desired state. For example, the image BP is selected to change the blank paper removal candidate, and as illustrated in FIG. 12, the image BP of the blank paper removal candidate is in the selected state (highlighted). Then, the completion button 138 is operated by the operation of the input units 21 and 101. The operation of the completion button 138 corresponds to a confirmation operation of confirming the blank paper removal candidate and the non-removal candidate on the blank paper preview screen 130. The discarding button 139 is operated when it is wanted to discard the image data of the document D that has been read. As a result of confirming the image BP of the blank paper removal candidate, the user may want to scan the document D again. In this case, the user operates the discarding button 139 to discard the image data of the document D that is no longer needed.

Next, the preview display processing unit 761 displaying the blank paper preview screen 130 described above, the display switching unit 762 switching the display mode of the selected image BP to the selected state of the blank paper removal candidate or the non-removal candidate, the data generation unit 88 operating when the image of the blank paper removal target is confirmed by the operation of the completion button 138, and the blank paper removal level setting unit 78 will be described.

The preview display processing unit 761 causes the display units 22 and 102 to display an image preview based on the screen data generated by the screen generation processing described above. The screen generation processing includes processing of incorporating the image BP of the blank paper removal candidate into the screen, processing of incorporating the page information of the image BP into the page information display unit 132, processing of incorporating component data such as the removal level adjusting unit 133, the first selected unit 134, and the second selected unit 135 into the screen, and processing of incorporating the enlarged image ZP of one image of a blank paper removal candidate into the enlarged display unit 136, or the like.

The preview display processing unit 761 inputs character recognition information from the OCR 86 and blank paper determination result information indicating a determination result of whether it is blank paper from the blank paper determination unit 87. In the present embodiment, by default, the image of the character-absent document is not preview-displayed on the blank paper preview screen 130. When the "character-absent document display function" is enabled by the selection of the first selected unit 931 (FIG. 4), the preview display processing unit 761 includes (do not exclude) an image, which is determined to be the character-absent document based on the character recognition information, on the preview image among the images determined by the blank paper determination unit 87 as the blank paper removal candidate. On the other hand, when the "character-absent document display function" is disabled, the image determined to be the character-absent document among the images determined to be the blank paper removal candidate is excluded from the preview image. In addition, when the "character-present document non-display function" is enabled by the selection of the second selected unit 932 (FIG. 4), the preview display processing unit 761 excludes an image determined to be the character-present document from the preview image based on the character recognition information among the images determined by the blank paper determination unit 87 as the blank paper removal candidate. Accordingly, when the "character-absent document display function" is enabled, the image BP of the character-absent document is also preview-displayed on the blank paper preview screen 130. In addition, when the "character-present document non-display function" is enabled, the image of the character-present document is not preview-displayed on the blank paper preview screen 130.

In addition, when an operation signal of ON and OFF of the selected unit such as a checkbox on the screen is input from the input units 21 and 101 during the display of the blank paper preview screen 130, the preview display processing unit 761 performs display processing of reflecting the input or instruction, which may be switching the display mode of ON and OFF of the selected unit on the screen, or the like, by the input units 21 and 101 from the user on the screen.

When an image is selected by the operation of the input units 21 and 101, the display switching unit 762 switches the display mode of the image to the selected state in which the blank paper removal candidate or the non-removal candidate is selected. In this example, when an image is selected by the operation of the input units 21 and 101, the display switching unit 762 switches the display mode of the image to the selected state in which the blank paper removal candidate is selected. In the present embodiment, two types of operation methods that cause an image of a blank paper removal candidate to be in a selected state are prepared. One is a method of operating the touch panel by the input unit 21 or operating a pointing device such as a mouse constituting the input unit 101 to select the image BP of a blank paper removal candidate and set the image BP in the selected state. When the user selects the image BP wanted to be removed as blank paper from the images BP of the blank paper removal candidates by the operation of the input units 21 and 101, it may be configured to highlight the images such as the images BP of the third page and the fourth page illustrated in FIG. 12.

It may be configured such that the user may select the image BP of the non-removal candidate by the operation of the input units 21 and 101. For example, it may be configured such that when a selected unit such as a checkbox (not illustrated) that sets all the images BP in a selected state is provided, and the selected unit is selected and enabled, all the images BP are highlighted as the blank paper removal candidate. After that, when the user selects the image BP wanted to be a non-removal candidate, the highlighting is canceled and the image BP is switched to the non-removal candidate. As a result, as illustrated in FIG. 12, the images BP of the third page and the fourth page that the user wants to be the blank paper removal targets are highlighted as the images of the blank paper removal candidates.

The other one is a method that indirectly causes an image of a blank paper removal candidate to be in a selected state by operating the removal level adjusting unit 133 to adjust the blank paper removal level. When the blank paper removal level is adjusted by operating the removal level adjusting unit 133, the display of the blank paper removal candidate and the non-removal candidate of the image is switched in association with the change in the value of the adjusted blank paper removal level. That is, when the user operates the input units 21 and 101 to operate the removal level adjusting unit 133 on the screen to change the blank paper removal level, the display switching unit 762 performs switching processing of switching the display between the blank paper removal candidate and the non-removal candidate in association with the changed blank paper removal level.

The image BP that does not satisfy the blank paper removal level is displayed by being changed from the blank paper removal candidate to the non-removal candidate in association with the operation of reducing the blank paper removal level by the removal level adjusting unit 133. In this example, when the removal level adjusting unit 133 is operated to the side in which the blank paper removal level becomes smaller and the image BP of the blank paper removal candidate is switched to the non-removal candidate, the image BP may disappear from the blank paper preview screen 130 and may not be previewed. That is, the image BP of the blank paper removal candidate may be switched to the non-removal candidate by disappearing from the screen. In addition, the image BP that satisfies the blank paper removal level is displayed by being changed from the non-removal candidate to the blank paper removal candidate in association with the operation of increasing the blank paper removal level by the removal level adjusting unit 133. In this example, when the removal level adjusting unit 133 is operated to the side in which the blank paper removal level becomes high and the image of the non-removal candidate that has not been displayed until then is switched to the blank paper removal candidate, the image BP appears and is previewed on the blank paper preview screen 130. That is, when the image of the non-removal candidate appears on the screen, the image is switched to the blank paper removal candidate.

In addition, in the present embodiment, the removal level adjusting unit 133 is, for example, a slider 133A. The user can adjust the blank paper removal level by slidingly operating the slider 133A by the operation of the input units 21 and 101.

When receiving the confirmation operation of confirming the blank paper removal candidate and the non-removal candidate from the input units 21 and 101, the data generation unit 88 generates the reading data (scan data) based on the remaining image data obtained by removing the image data of the blank paper removal target including the blank paper removal candidate from the image data of the document D. The reading data is generated, for example, as a file in a file format specified by the user. The data generation unit 88 includes the blank paper removal processing unit 881 described above as a processing unit that removes the image data of the blank paper removal target including the blank paper removal candidate among the image data of the document D. In addition, the data generation unit 88 includes the file format conversion unit 882 described above as a processing unit that generates reading data based on the remaining (non-removal target) image data after removing the image data of the blank paper removal target.

The blank paper removal processing unit 881 performs processing of removing a blank paper page from the image data of the document D based on the determination result of the blank paper determination unit 87 or the confirmation result confirmed as the blank paper removal candidate by the operation on the blank paper preview screen 130. Here, the image data of the document D that is the target of the blank paper removal processing is RGB data or YUV data. That is, the blank paper removal processing unit 881 performs blank paper removal processing of removing a blank paper page that is the image data confirmed as the blank paper removal candidate from the image data of the document D before the file format conversion unit 882 performs processing of converting the file format with respect to the image data of the document D. The blank paper removal processing unit 881 sends the image data after the blank paper removal processing to the file format conversion unit 882.

The file format conversion unit 882 converts the image data of the document D into a file of a specified storage format (file format) among the output conditions specified by the user. The file format conversion unit 882 converts the RGB format image data read out from the RGB buffer 81 or the YUV format image data read out from the YUV buffer 83 into a file of the specified storage format. The file format conversion unit 882 generates a file of the specified storage format such as JPEG format, PDF format, and TIFF format for the image data. When the file is generated in the image reading apparatus 11, the control unit 50 transfers the file to the host apparatus 100 via the output IF64. On the other hand, when the file is generated in the host apparatus 100, the file is stored in a predetermined storage area specified by the user in the host apparatus 100.

In this manner, when receiving the confirmation operation from the input units 21 and 101, the data generation unit 88 removes the image data of the blank paper removal target including the image of the blank paper removal candidate from the image data of the document D, and generates scan data based on the remaining image data. The scan data is generated as a file of a predetermined file format desired by the user under the output conditions. Here, the image data of the blank paper removal target includes the image data of the blank paper removal candidate composed of the character-absent document and the character-present document that are excluded from the preview image by the default setting and the character-present document non-display function.

In addition, when receiving the confirmation operation, the blank paper removal level setting unit 78 updates the setting to the blank paper removal level that satisfies the confirmed blank paper removal candidate. Here, the blank paper removal level that satisfies the confirmed blank paper removal candidate includes the blank paper removal level adjusted by operating the removal level adjusting unit 133, and the blank paper removal level satisfied by the image of the changed blank paper removal candidate when the blank paper removal candidate is changed by selecting the image BP. In the former case, the blank paper removal level setting unit 78 sets the adjusted blank paper removal level adjusted by the removal level adjusting unit 133.

In addition, in the latter case, the blank paper removal level setting unit 78 sets the blank paper removal level that satisfies the blank paper removal candidate confirmed after the blank paper removal candidate is changed by the selection of an image. At this time, the blank paper removal level setting unit 78 calculates the blank paper removal level that satisfies the condition that the image changed to the blank paper removal candidate becomes the blank paper removal candidate. Specifically, the minimum threshold value PS0 that satisfies the condition that the print area pixel number PN, which is the number of pixels in the print area PA, is equal to or less than the threshold value PS0 is calculated based on the histogram HD of the image, and the blank paper removal level responding to the minimum threshold value PS0 is obtained by referring to the blank paper determination table BT.

At this time, when there are a plurality of images of the removed blank paper removal candidates, the blank paper removal level setting unit 78 updates the setting value of the blank paper removal level according to the highest value in the setting values of the blank paper removal levels among the images. In this manner, when the selected state is confirmed and the blank paper preview screen 130 is completed, the setting value of the blank paper removal level is updated. Accordingly, when previewing the read image, the preview display processing unit 761 previews the image based on the setting value of the latest blank paper removal level that is set at the end of reading of the document D (when the selected state is confirmed) before the image is previewed.

In addition, the discarding button 139 is operated when discarding the read image data. When the user confirms the image BP on the blank paper preview screen 130 and desires to redo the scan, the user operates the discarding button 139 to discard the image data read this time. When receiving the discarding instruction signal obtained by operating the discarding button 139 from the input units 21 and 101, the data generation unit 88 discards the read image data.

When the image processing unit 73 is in the image reading apparatus 11 as illustrated in FIG. 9, the RGB buffer 81, the YUV buffer 83, the histogram buffer 85, or the like are constituted with the volatile memory 61 (FIG. 3) such as a RAM. On the other hand, when the image processing unit 73 is in the image reading control apparatus 110, the histogram buffer 85 or the like is constituted with a memory (not illustrated) included in the computer 120 in the host apparatus 100. The YUV generation unit 82 and the histogram generation unit 84 included in the image processing unit 73 of the image reading apparatus 11 may be configured by software, but may also be configured by hardware for high-speed processing.

Operation

Next, the operation of the image reading apparatus 11 will be described with reference to FIGS. 17 and 18 or the like.

When scanning the plurality of sheets of document bundles D using the image reading apparatus 11, the user selects ON and OFF of the blank paper removal function and the preview function on the first setting screen 91 in advance. In the following, a case where the blank paper removal function is ON (enabled) will be taken as an example. In addition, it is assumed that the user sets the blank paper removal level, for example, to "15" on the first setting screen 91 according to the background color and the paper quality of the document D. In addition, for example, when a desired document is removed as a blank paper page, the value of the blank paper removal level is lowered. In addition, when the blank paper document is not removed as a blank paper page, the value of the blank paper removal level is increased.

When scanning the plurality of sheets of document bundles D, the user sets the plurality of sheets of documents D in the document support 13. Then, the reading start is instructed from the menu of the display unit 22, or the reading start is instructed by operating the input unit 101 of the host apparatus 100. As a result, the control unit 50 receives the reading job. Then, when the computer 60 of the control unit 50 receives the reading job, the computer 60 executes the scan processing routine.

First, the computer 60 reads the document. That is, the computer 60 drives the transport mechanism 30 to transport the document D, and drives the light source 41 and the image sensor 42 to read the document D being transported. The reading data of the document D is sent from the image sensor 42 to the image processing unit 73 via the AFE 66. The image processing unit 73 generates the image data of the YUV format (YUV data) from the image data of the RGB format (RGB data) which is reading data. In this manner, the image processing unit 73 temporarily stores the RGB data and the YUV data in the buffers 81 and 83.

Hereinafter, the blank paper preview display control processing executed by the computer 60 of the image reading apparatus 11 and the computer 120 on the side of the image reading control apparatus 110 will be described with reference to FIG. 13. The processing executed by the computer 60 of the image reading apparatus 11 and the processing executed by the computer 120 on the side of the image reading control apparatus 110 are basically the same processing contents although the input unit and display unit thereof to be input and output are different from each other. Accordingly, in the following, the blank paper preview display control processing executed by the computer 120 on the side of the image reading control apparatus 110 will be described as an example. In the following description, the processing executed by the computer 60 of the image reading apparatus 11 may replace the computer 120 with the computer 60, the input unit 101 with the input unit 21, and the display unit 22 with the display unit 102.

When the image reading apparatus 11 ends a scan, a scan end notification is transmitted from the computer 60 of the image reading apparatus 11 to the host apparatus 100. At the end of scan, the image data obtained by the image reading apparatus 11 reading the document bundle D is transmitted to the host apparatus 100. The image data is used for processing necessary for generating the blank paper preview screen 130 such as image preview display and character recognition processing. The image data is, for example, image data in the RGB format or the YUV format is compressed into a predetermined format, but may not be compressed.

First, in a step S11, the computer 120 determines whether scan has been ended. That is, the computer 120 determines whether a scan end notification has been received from the image reading apparatus 11. When the scan is ended, the computer 120 proceeds to the next step S12, and when the scan is not ended, the computer 120 waits. The end of scan at this time corresponds to the preview screen display timing in FIG. 7, which is determined according to the scan format. When the reading operation of the document bundle D is completed and the scan is ended (including the end of the job), the process proceeds to the step S12.

In the step S12, the computer 120 performs blank paper determination processing according to the blank paper removal level. Specifically, the blank paper determination unit 87 of the computer 120 performs the processing. Based on the histogram HD illustrated in FIG. 10 generated by the histogram generation unit 84, the blank paper determination unit 87 obtains the brightness threshold value LS by offsetting to the side whose brightness is low by the offset amount ΔOF from the background color brightness value GC, which is the brightness value of the peak for each color representing the background color of the paper of the document D. The blank paper determination unit 87 calculates the number of pixels in the print area PA, which is an area equal to or less than the brightness threshold value LS, as the print area pixel number PN. Next, the blank paper determination unit 87 acquires the threshold value PS0 corresponding to the value of the current blank paper removal level set on the first setting screen 91 illustrated in FIG. 4 with reference to the blank paper determination table BT illustrated in FIG. 8. Then, the image of the document D in which the print area pixel number PN is equal to or less than the threshold value PS0 is determined as a blank paper document. In this manner, the blank paper determination processing specifies the page of the blank paper document among the scan data (reading data) including the images of the plurality of sheets of documents D.

In a step S13, the computer 120 determines whether the character-absent document display is set. When the setting of the "character-absent document display" is ON, the process proceeds to a step S14, and when the setting is OFF, the process proceeds to a step S15. The user sets ON for the setting when the user wants to confirm the blank paper document in the blank paper preview although there are no characters in the blank paper document, or when the user wants to confirm whether the value of the blank paper removal level is appropriate in the blank paper preview. Since the user who has this need wants to confirm the image of the blank paper removal candidate of the character-absent document in the preview, the user sets ON for the setting of the "character-absent document display". When the setting is OFF, the blank paper is not preview-displayed. Accordingly, when the setting is ON, the image of the blank paper document may be previewed for blank paper without confirming that the characters are absent, but when the setting is OFF, there is a need to confirm the character-absent document that is not previewed for blank paper, by the OCR 86.

In the step S14, the computer 120 determines whether the character-present document non-display is set. When the setting of the "character-present document non-display" is ON, the process proceeds to the step S15, and when the setting is OFF, the process proceeds to a step S16. There is a need wanting to remove an image of a blank paper document in which only format characters such as page numbers are printed in the blank space such as the top margin or bottom margin of the document D, as blank paper. A user who has this need sets ON for the setting of the "character-present document non-display". In addition, when characters are present, it may be a document that should not be removed as blank paper, and thus the user who desires to confirm the character-present document, sets OFF for "character-present document non-display". When the setting is ON, it is necessary to confirm the character-present document that is not previewed for blank paper with the OCR 86.

In the step S15, the computer 120 performs OCR processing. Specifically, the OCR 86 performs character recognition processing on an image of a blank paper document determined to be blank paper to determine the presence or absence of characters. When the characters are not recognized by the OCR 86, the computer 120 determines that it is a character-absent document, and when the characters are recognized, the computer 120 determines that it is a character-present document.

In a step S16, the computer 120 performs blank paper document selection processing. That is, the computer 120 selects an image to be preview-displayed from the blank paper documents determined to be blank paper by the blank paper determination processing. When the "character-absent document display" is ON, the computer 120 selects a character-absent blank paper document. In addition, when the "character-present document non-display" is ON, the computer 120 does not select a character-present blank paper document.

In a step S17, the computer 120 performs a blank paper preview screen display processing. Specifically, the display control unit 76 of the computer 120 generates an image of a blank paper preview screen in which, for example, a thumbnail image of a blank paper document selected in the blank paper document selection processing is disposed in the preview area in the center of the screen, and displays the image of the generated blank paper preview screen on the display unit 102. As a result, the blank paper preview screen 130 illustrated in FIG. 12 is displayed on the display unit 102. In the present embodiment, the processing of the step S17 corresponds to an example of the preview display processing step.

In a step S18, the computer 120 determines whether the blank paper removal level has been changed. When the blank paper removal level is changed, the process returns to the step S12, and when it is not changed, the process proceeds to the next step S19. For example, when the user wants to change the value of the blank paper removal level, the user operates the slider 133A to change the value of the blank paper removal level. When the slider 133A is slidingly operated to the left direction, the value of the blank paper removal level becomes small, and when the slider 133A is slidingly operated to the right direction, the value of the blank paper removal level becomes large. The user operates the slider 133A by using, for example, a pointing device such as a mouse constituting the input unit 101. The computer 120 acquires the change of the blank paper removal level and the value of the blank paper removal level after the change from the value of the position coordinate of the slider 133A based on the operation signal input from the input unit 101.

By adjusting the blank paper removal level by slidingly operating the slider 133A, the user switches the image BP of the blank paper removal candidate displayed in the preview display area 131 in association with the adjusted blank paper removal level. When the blank paper removal level is changed in the direction in which the value becomes large, the image of the non-removal candidate is switched to the blank paper removal candidate in association with the change. On the other hand, when the blank paper removal level is changed in a direction in which the value becomes smaller, the image of the blank paper removal candidate is switched to the non-removal candidate in association with the change. The user selects the image of the remaining blank paper removal candidate by, for example, changing the value of the blank paper removal level to be smaller and switching the image of the blank paper removal candidate to the non-removal candidate in association with the change. For example, the user narrows down the number of images BP of the blank paper removal candidates by switching between the blank paper removal candidate and the non-removal candidate. The selection processing by switching images is performed by repeatedly executing the processing of the step S12 to the step S17.

Figure 14:
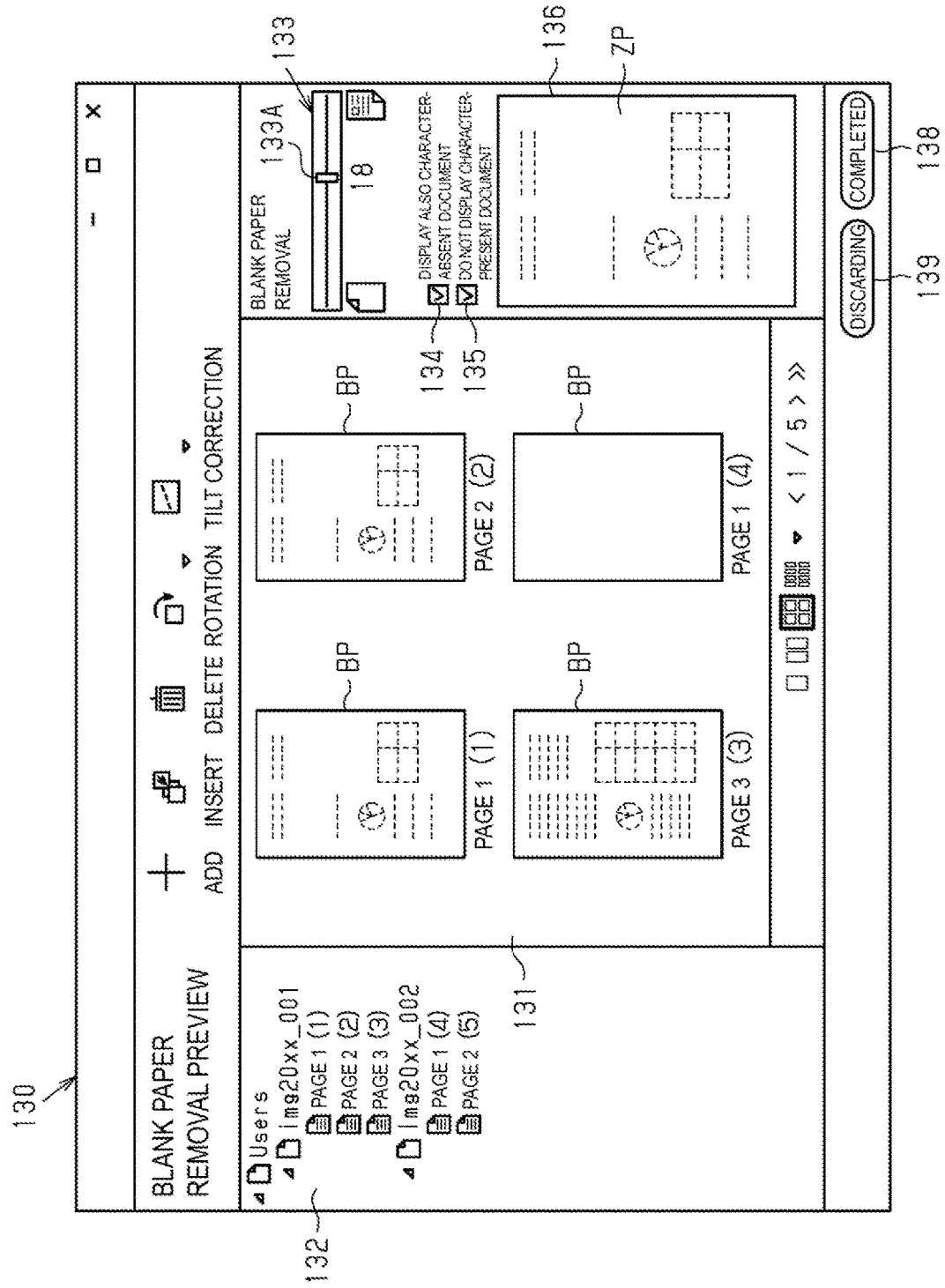
FIG. 14 is a diagram illustrating a blank paper preview screen.

As illustrated in FIG. 14, when the slider 133A is slidingly operated in the direction in which the value of the blank paper removal level becomes larger, the threshold value PS0 that determines the print area PA in the histogram HD becomes large, and thus the print area pixel number PN increases a little, and the image of the document D having a slightly higher density is displayed in the preview display area 131 as a blank paper preview image. In the example illustrated in FIG. 14, the image BP of the document with a slightly higher density is displayed on the third page. The image BP of the blank paper document on the third page in FIG. 12 is the fourth page in FIG. 14 due to the addition of a new blank paper removal candidate on the third page.

For example, since the show-through document is wanted to be blank paper, when the show-through document may be a non-removal candidate, the user slidingly operates the slider to the side in which the value of the blank paper removal level becomes larger. Then, as illustrated in FIG. 14, the document on the third page appears as an image of a blank paper removal candidate. In the present embodiment, since the blank paper preview screen that previews the blank paper corresponds to an example of the preview screen, the non-removal candidate is not displayed. In the case of the present embodiment, changing from a non-removal candidate to a removal candidate means changing from a non-display state in which the non-removal candidate is not displayed to a display state in which the blank paper removal candidate is displayed.

Figure 15:
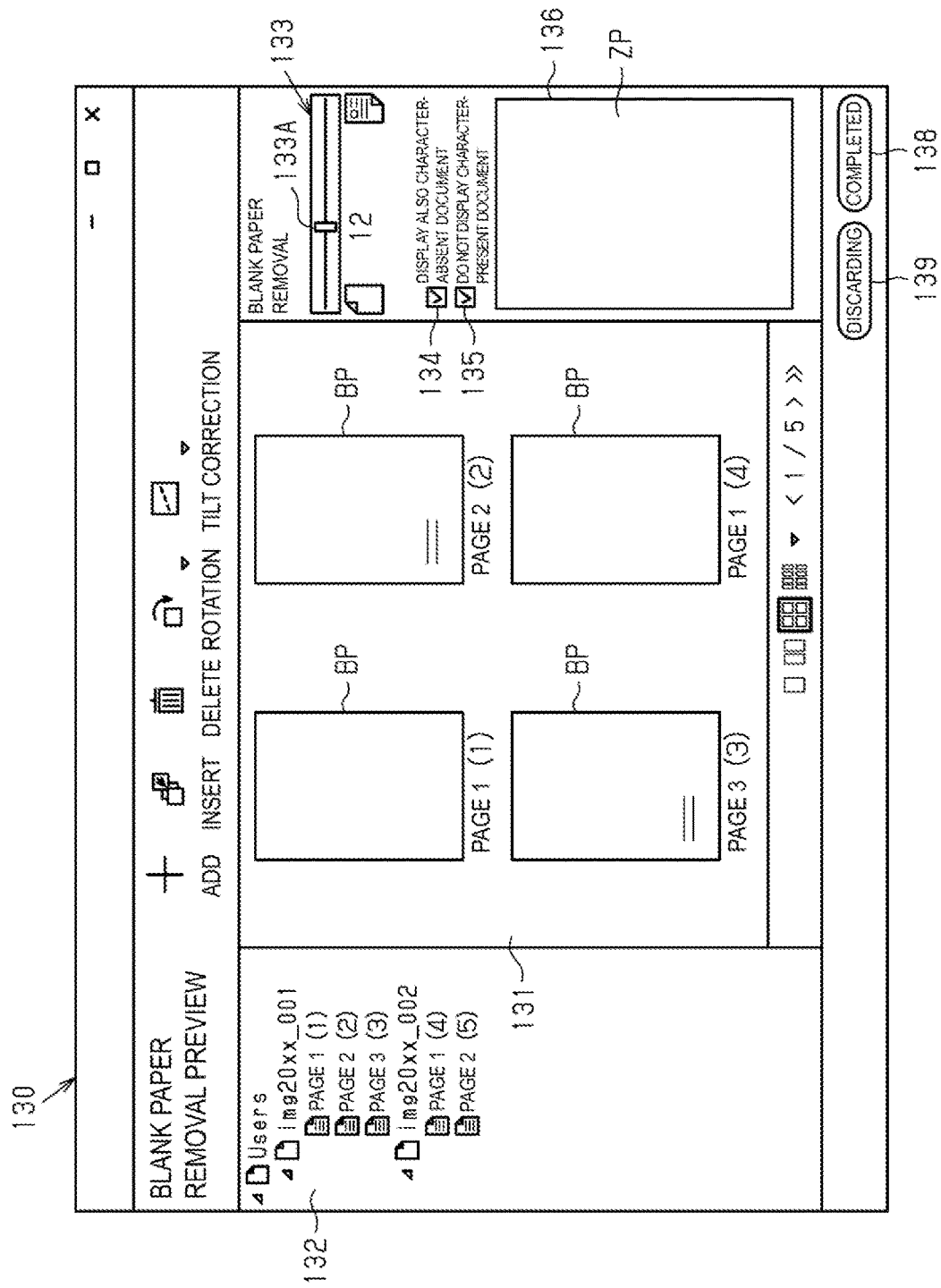
FIG. 15 is a diagram illustrating a blank paper preview screen.

On the other hand, as illustrated in FIG. 15, when the slider 133A is slidingly operated in the direction in which the value of the blank paper removal level becomes small, the threshold value PS0 that determines the print area PA in the histogram HD decreases, and the image of the document whose print area pixel number PN exceeds the threshold value PS0, that is, the image that has been regarded as a blank paper removal candidate until then, is no longer determined as blank paper and disappears. In the example of FIG. 15, the original images of the first page and the second page in FIG. 12 disappear. In FIG. 15, the original third page and fourth page are displayed on the new first page and second page.

For example, when there is an image that is not desired to be removed as blank paper, the user slidingly operates the slider 133A in the direction in which the value of the blank paper removal level becomes small. Then, as illustrated in FIG. 15, the images BP on the first page and the second page in FIG. 12 disappear. That is, the original images BP on the first page and the second page are no longer determined to be blank paper, and thus disappear from the preview display area 131. In the present embodiment, since the non-removal candidate is not preview-displayed on the blank paper preview screen 130, when the blank paper removal candidate is changed to the non-removal candidate, the image of the non-removal candidate disappears from the screen. The displayed image BP is selected as the blank paper removal candidate by the disappearance of the image switched from the blank paper removal candidate to the non-removal candidate.

In a step S19 in FIG. 13, the computer 120 determines whether the image of the document of the blank paper removal candidate is selected. On the blank paper preview screen 130 illustrated in FIG. 12, the user selects an image wanted to be removed as blank paper by the operation of the input unit 101 such as a mouse. When the coordinate value of the operation position based on the operation signal input from the input unit 101 is the position of the image BP of the blank paper removal candidate, the computer 120 determines that the image has been selected. When the image BP of the document of the blank paper removal candidate is selected, the process proceeds to a step S20, and when selection is not made, the process proceeds to a step S21.

In the step S20, the computer 120 highlights the selected document. The computer 120 specifies an image selected from the coordinate value of the operation position based on the operation signal input from the input unit 101, and highlights the selected image by attaching a thick frame or a frame of a specific color to the specified image as illustrated in FIG. 12. In addition, in the present embodiment, the page information responding to the selected image from the page information displayed in the page information display unit 132 in the left column of the blank paper preview screen 130 illustrated in FIG. 12, is highlighted in a thick frame or a frame of a specific color. In the present embodiment, the processing of the step S20 corresponds to an example of the display switching step.

When the user finishes the selection of the blank paper removal candidate, the user operates the completion button 138 in the blank paper preview screen 130. The operation of the completion button 138 is a confirmation operation that confirms the image of the blank paper removal candidate in the selected state as a blank paper removal target, and corresponds to a blank paper removal operation that instructs the removal of the image of the confirmed blank paper removal target.

In the step S21, the computer 120 determines whether there is a blank paper removal operation. When there is a blank paper removal operation, the process proceeds to a step S22, and when there is no blank paper removal operation, the process returns to the step S18.

In the step S22, the computer 120 sets the blank paper removal level. Specifically, the processing is executed by the blank paper removal level setting unit 78. That is, the blank paper removal level setting unit 78 updates the setting to the blank paper removal level according to the position of the slider 133A when the selected state is confirmed. In the present embodiment, the processing of the step S22 corresponds to an example of the blank paper removal level setting step.

In a step S23, the computer 120 executes blank paper removal. That is, the computer 120 removes the image confirmed as the blank paper removal target, that is, the blank paper page. Specifically, the processing is performed by the blank paper removal processing unit 881 in the data generation unit 88. Here, the image reading control apparatus 110 receives the image data of the document D read by the image reading apparatus 11 as image data in a predetermined format obtained by compressing, for example, the image data of the RGB format or the YUV format according to the need, from the image reading apparatus 11. The blank paper removal processing unit 881 removes the image data of the blank paper removal target including the image PG in the selected state from the image data of the read document D, and sends the remaining image data to the file format conversion unit 882. When the image data is still only in the image reading apparatus 11, the computer 120 may perform the notification of the image to be removed, and the blank paper removal processing unit 881 (FIG. 9) in the image reading apparatus 11 may remove the blank paper page in the image data.

In a step S24, the computer 120 generates scan data. Specifically, the processing is executed by the file format conversion unit 882 in the data generation unit 88. The file format conversion unit 882 generates scan data by converting the image data from the blank paper removal processing unit 881 into a file in a predetermined file format specified by the user as an output condition. In the present embodiment, the processing of the step S24 corresponds to an example of the data generation step.

When the blank paper preview screen 130 is displayed on the display unit 22 of the image reading apparatus 11, the computer 60 executes the blank paper preview display control processing illustrated in FIG. 13. Which of the computers 60 and 120 executes the blank paper preview display control processing illustrated in FIG. 13 may depend on whether, for executing the start of scan, the user operates the input unit 21 of the image reading apparatus 11 or operates the input unit 101 of the host apparatus 100. That is, when the user operates the input unit 21 of the image reading apparatus 11 to instruct the start of scan, the computer 60 that has received the instruction of the start of scan may execute the blank paper preview screen display control processing. On the other hand, when the user operates the input unit 101 of the host apparatus 100 to instruct the start of scan, the computer 120 that has received the instruction of the start of scan may execute the blank paper preview screen display control processing.

In addition, when the computer 60 of the image reading apparatus 11 executes the blank paper preview screen display control processing, the file format conversion unit 882 in the image reading apparatus 11 transmits the file converted to the file format specified in the output condition to the host apparatus 100 via the output IF64.

According to the present embodiment described above, the following effects can be obtained.

(1) The image reading system 10 includes the image reading apparatus 11 that reads the document D, and an image reading control apparatus that controls the image reading apparatus 11. The image reading system 10 has a blank paper removal function of removing the image of a blank paper removal candidate, which satisfies the blank paper removal level from the images of the document D read by the image reading apparatus 11, as a blank paper page. The image reading system 10 includes the preview display processing unit 761 that preview-displays at least a portion of the image among the images of the read document D in a selectable state on the display units 22 and 102, the display switching unit 762 that switches the display mode of an image to the selected state in which the blank paper removal candidate is selected when the image is selected by the operation of the input units 21 and 101, the data generation unit 88, and the blank paper removal level setting unit 78. When the selected state is confirmed by the operation of the input units 21 and 101, the data generation unit 88 generates the reading data based on the remaining image data obtained by removing the image data of the blank paper removal target including the confirmed blank paper removal candidate from the image data of the document D. The blank paper removal level setting unit 78 sets a blank paper removal level that can make the confirmed image in the selected state a blank paper removal candidate.

Accordingly, when the user who has confirmed the previewed image selects the image by the operation of the input units 21 and 101, the display mode of the image is switched to the selected state in which the blank paper removal candidate or the non-removal candidate is selected. In addition, it is possible to set a blank paper removal level suitable for the selected state of the image to be removed as blank paper. Accordingly, the user can appropriately perform the selection of the image to be removed as blank paper and the setting of the blank paper removal level with a simple operation.

(2) Based on the image data of the read document D, the blank paper determination unit 87 is provided that determines that the image that satisfies the blank paper removal level is a blank paper removal candidate and determines that the image that does not satisfy the blank paper removal level is a non-removal candidate. The preview display processing unit 761 preview-displays at least a portion of the image that are determined to be a blank paper removal candidate among the images of the document D, on the display units 22 and 102. Accordingly, since at least a portion of the image determined to be a blank paper removal candidate is preview-displayed, the user may select an image wanted to be removed from the images of the blank paper removal candidates. Accordingly, the user can easily select the image of the blank paper document wanted to be removed.

(3) The preview display processing unit 761 displays the removal level adjusting unit 133 configured to adjust the blank paper removal level on the display units 22 and 102. When the removal level adjusting unit 133 adjusts the blank paper removal level by the operation of the input units 21 and 101, the display switching unit 762 switches the display mode of the image to the selected state in which the blank paper removal candidate is selected in association with the changed blank paper removal level. Accordingly, the blank paper removal level can be adjusted by the removal level adjusting unit 133, and the display mode of the image is switched to the selected state in which the blank paper removal candidate is selected in association with the adjusted blank paper removal level. Accordingly, the user adjusts the blank paper removal level with the removal level adjusting unit 133 and confirms the display mode of the image that is switched in association with the adjusted blank paper removal level, so that the user can appropriately perform the selection of the desired image and the adjustment of the desired blank paper removal level.

(4) The removal level adjusting unit 133 is the slider 133A that is slidingly operated to a position corresponding to the value of the blank paper removal level. Accordingly, when the user slidingly operates the slider 133A, the blank paper removal level is adjusted to a value corresponding to the slide position, and switching is made to the selected state in which the blank paper removal candidate is selected in association with the adjusted blank paper removal level. Accordingly, the user can easily make adjustment to the desired blank paper removal level. In addition, since it is a slide operation, it is easier to visually recognize which level it is in the whole and how much adjustment should be made as compared with the input of a numerical value, so that adjustment can be easily made to an appropriate blank paper removal level.

(5) The image that does not satisfy the blank paper removal level is displayed by being changed from the removal candidate to the non-removal candidate in association with the operation of reducing the blank paper removal level by the removal level adjusting unit 133. Accordingly, when performing the operation of reducing the blank paper removal level by the removal level adjusting unit 133, the display mode of the image can be seen in which the blank paper removal candidate is changed to the non-removal candidate in association with the value of the blank paper removal level adjusted to be small. Accordingly, it is possible to appropriately adjust the blank paper removal level and select the image to be removed as blank paper.

(6) The preview display processing unit 761 displays both the previewed image and the removal level adjusting unit 133 in a state in which both are disposed to be visually recognizable, on the display units 22 and 102. Accordingly, when operating the removal level adjusting unit 133, the user can appropriately adjust the blank paper removal level when checking the change in the display of the image.

(7) When the read image is previewed, the preview display processing unit 761 previews the image based on the latest blank paper removal level that is set at the end of reading of the document before the image is previewed. Accordingly, since the image is previewed based on the latest blank paper removal level that is set at the end of reading of the document before being previewed, an appropriate blank paper removal level is easily applied compared to a case in which the user sets the blank paper removal level again before the reading start to read the document this time. Accordingly, it is easy to reduce the number of operations for the user to select an image as a blank paper removal candidate.

(8) The preview display processing unit 761 displays the page information display unit 132 that displays the page information of the previewed image on the display units 22 and 102. When an image is selected by the operation of the input units 21 and 101 among the previewed images, the display switching unit 762 highlights the page information responding to the image. Accordingly, it is possible to confirm whether the image of the blank paper removal candidate is selected also from the page information of the page information display unit. Although an image is mistakenly selected as a blank paper removal candidate, it is easy to find the image.

(9) The preview display processing unit 761 displays the enlarged image ZP obtained by enlarging the image selected by the operation of the input unit on the display units 22 and 102. Accordingly, since the user can confirm the image selected by the input units 21 and 101 as an enlarged image, it is possible to appropriately determine whether the image is necessary to be discarded as a blank paper document.

(10) The first selected units 134 and 931 configured to be selected to include the image of the character-absent document as the image of the blank paper removal candidate to be displayed by the preview display processing unit 761 may be displayed on the display units 22 and 102. Accordingly, since it is possible to select to preview-display the image of the character-absent document, the user can appropriately determine whether the character-absent document should also be removed as a blank paper document by looking at the image. It is possible to reduce the situation in which the necessary image of the character-absent document is removed as blank paper against the user's intention. In addition, it is also possible to meet the needs of the user who do not need to confirm the image of the character-absent document.

(11) The second selected units 135 and 932 configured to be selected not to include the image of the character-present document in the image of the blank paper removal candidate to be displayed by the preview display processing unit 761, are displayed on the display units 22 and 102. Accordingly, since it is possible to select whether to display the image of the character-present document, it is possible to select whether to display the image of the character-present document among the images determined as blank paper removal candidates according to the needs of the user. For example, it is possible to eliminate the need to check a blank paper document in which only the characters of the page information are recorded. In addition, although it is determined to be a blank paper removal candidate, it can meet the needs of the user who wants to confirm the image of the character-present document.

(12) As a result, when the continuous paper feeding mode, for continuously reading documents of one job as one job when the documents D are divided and set a plurality of times, is executed, the preview display processing unit 761 displays at least a portion of the image on the display units 22 and 102 at the timing when reading the document D set once finishes. The blank paper removal level setting unit 78 is configured to change the blank paper removal level according to the selected image even in the middle of the job. Accordingly, at least a portion of the image is preview-displayed even in the middle of the job when the continuous paper feeding mode is executed, and the blank paper removal level can be changed according to the selected image even in the middle of the job. The image obtained by reading the next set document in the middle of the job can be preview-displayed based on the changed blank paper removal level.

(13) The image reading control apparatus that controls the image reading apparatus 11 that reads the document D has a blank paper removal function of removing an image, which satisfies the blank paper removal level among the images of the document D read by the image reading apparatus 11, as a blank paper page. The preview display processing unit 761 that preview-displays at least a portion of the image among the images of the document D read by the image reading apparatus 11 in a selectable state on the display units 22 and 102, the display switching unit 762 that switches the display mode of an image to the selected state in which the blank paper removal candidate or the non-removal candidate is selected when the image is selected by the operation of the input units 21 and 101, the data generation unit 88, and the blank paper removal level setting unit 78 are provided. When the selected state is confirmed by the operation of the input units 21 and 101, the data generation unit 88 generates the reading data based on the remaining image data obtained by removing the image data of the blank paper removal target including the confirmed blank paper removal candidate from the image data of the document D. The blank paper removal level setting unit 78 sets a blank paper removal level that can make the confirmed image in the selected state a blank paper removal candidate. According to the configuration, the same effect as that of the image reading system 10 can be obtained.

(14) The image reading apparatus 11 has a blank paper removal function of removing an image that satisfies the blank paper removal level among the images obtained by reading the document D, as a blank paper page. The image reading apparatus 11 includes the preview display processing unit 761 that preview-displays at least a portion of the image among the images of the read document D in a selectable state on the display units 22 and 102, the display switching unit 762 that switches the display mode of an image to the selected state in which the blank paper removal candidate or the non-removal candidate is selected when the image is selected by the operation of the input units 21 and 101, the data generation unit 88, and the blank paper removal level setting unit 78. When the selected state is confirmed by the operation of the input units 21 and 101, the data generation unit 88 generates the reading data based on the remaining image data obtained by removing the image data of the blank paper removal target including the confirmed blank paper removal candidate from the image data of the document D. The blank paper removal level setting unit 78 sets a blank paper removal level that can make the confirmed image in the selected state a blank paper removal candidate. According to the configuration, the same effect as that of the image reading system 10 can be obtained.

(15) The image reading method performs blank paper removal processing of removing an image that satisfies the blank paper removal level among the images obtained from the document D read by the image reading apparatus 11, as a blank paper page. The image reading method includes preview-displaying at least a portion of the image among the images of the read document D in a selectable state on the display units 22 and 102, switching the display mode of an image to the selected state in which the blank paper removal candidate or the non-removal candidate is selected when the image is selected by the operation of the input units 21 and 101, generating the reading data based on the remaining image data obtained by removing the image data of the blank paper removal target including the confirmed blank paper removal candidate from the image data of the document D when the selected state is confirmed by the operation of the input units 21 and 101, and setting a blank paper removal level that can make the confirmed image in the selected state a blank paper removal candidate. According to the method, the same effect as that of the image reading system 10 can be obtained.

(16) The program PR is executed by the computers 60 and 120 that implement the blank paper removal function of removing the blank paper page satisfying the blank paper removal level from the images in the document D read by the image reading apparatus 11. The program PR causes the computers 60 and 120 to execute the preview display processing step S17, the display switching step S16, the data generation step S23 and S24, and the blank paper removal level setting step S22. In the preview display processing step, at least a portion of the image among the images of the document D read by the image reading apparatus 11 is preview-displayed in a selectable state on the display units 22 and 102. When an image is selected by the operation of the input units 21 and 101, the display switching step switches the display mode of the image to the selected state in which the blank paper removal candidate or the non-removal candidate is selected. When the selected state is confirmed by the operation of the input units 21 and 101, the data generation step generates the reading data based on the remaining image data obtained by removing the image data of the blank paper removal target including the confirmed blank paper removal candidate from the image data of the document D. The blank paper removal level setting step sets a blank paper removal level that can make the confirmed image in the selected state a blank paper removal candidate. According to the program PR, by causing the computers 60 and 120 to execute the program, the same effect as that of the image reading system 10 illustrated in the (1) described above can be obtained.

Second Embodiment

Next, the second embodiment will be described with reference to FIGS. 16 to 20. In this second embodiment, a configuration and a method are provided in which the function of switching the display between the blank paper removal candidate and the non-removal candidate of the previewed image and the function of updating the blank paper removal level are applied to the document preview screen 140 instead of the blank paper preview screen 130. The configuration of the image reading system 10 is the same as that of the first embodiment, except that the target that the computers 60 and 120 process by executing the program PR is the document preview screen 140. Hereinafter, only the processing related to the control of the document preview screen 140 of each component composed of the computers 60 and 120 and the software thereof will be described.

As illustrated in FIG. 3, the control unit 50 of the image reading apparatus 11 and the image reading control apparatus 110 include the display control unit 76, the blank paper removal setting unit 77, the blank paper removal level setting unit 78, the preview setting unit 79, the OCR 86, the blank paper determination unit 87 as an example of a determination unit, and the data generation unit 88. The display control unit 76 includes a preview display processing unit 761 and a display switching unit 762. In addition, the data generation unit 88 includes the blank paper removal processing unit 881 and the file format conversion unit 882.

The preview display processing unit 761 preview-displays at least a portion of the image among the images of the read document D in a selectable state on the display units 22 and 102. In the present embodiment, the preview display processing unit 761 preview-displays an image including at least the image of the non-removal candidate in a selectable state on the display units 22 and 102. In particular, the preview display processing unit 761 preview-displays all the images of the document D read in one job on the document preview screen 140 without acquiring the blank paper determination result information of the blank paper determination unit 87. Accordingly, since the blank paper determination result of the blank paper determination unit 87 is not required, the blank paper determination unit 87 may be omitted. The preview display processing unit 761 may preview-display the image of the non-removal candidate excluding the image of the blank paper removal candidate determined to be blank paper based on the blank paper determination result information of the blank paper determination unit 87 among the images of the document D.

When an image is selected by the operation of the input units 21 and 101, the display switching unit 762 switches the display mode of the image to the selected state in which the blank paper removal candidate or the non-removal candidate is selected. In this example, when an image is selected by the operation of the input units 21 and 101, the display switching unit 762 switches the display mode of the image to the selected state in which the non-removal candidate is selected.

When receiving the confirmation operation of confirming the blank paper removal candidate from the input units 21 and 101, the data generation unit 88 generates the reading data (scan data) based on the remaining image data obtained by removing the image data of the blank paper removal target including the blank paper removal candidate from the image data of the document D. The confirmation operation that confirms the blank paper removal candidate does not have to be performed in the state in which the blank paper removal candidate is selected, and may be performed in the state in which the non-removal candidate is selected, and in this case, by confirming the non-removal candidate, the opposite blank paper removal candidate will also be confirmed. Such indirect confirmation of the blank paper removal candidate is also included in the confirmation of the blank paper removal candidate.

The blank paper removal level setting unit 78 sets a removal level that satisfies the confirmed blank paper removal candidate. The blank paper removal level setting unit 78 calculates the blank paper removal level that satisfies the condition that the image becomes the blank paper removal candidate. Specifically, the threshold value PS0 of the minimum value that satisfies the condition that the print area pixel number PN, which is the number of pixels in the print area PA, is equal to or less than the threshold value PS0 is calculated based on the histogram HD of the image, and the blank paper removal level responding to the calculated threshold value PS0 is obtained by referring to the blank paper determination table BT.

Preview Screen

FIG. 16 is a document preview screen 140 displayed on the display units 22 and 102 after the job is ended when the preview function is ON in the present embodiment. The document preview screen 140 illustrated in FIG. 16 preview-displays all the images of the scan result on the display units 22 and 102. The document preview screen 140 is also a setting screen configured to be operated to set the image PG, which is wanted to be removed as a blank paper page, as a blank paper removal candidate. Although the present embodiment is configured to perform preview-display at the end of the job, when the continuous paper feeding mode, in which the document bundle D of one job is divided into a plurality of times, is set in the document support 13, and can be scanned, is executed as in the blank paper preview screen 130 of the first embodiment, the document preview screen 140 may be displayed even in the middle of one job when the scan of the document D set once is ended. In this case, when the continuous paper feeding mode is executed, the blank paper removal level may be changed even in the middle of the job at the timing when reading the document D set once finishes. For example, the blank paper removal level may be changed on the preview screen 140.

As illustrated in FIG. 16, the document preview screen 140 includes a preview display area 141 in which all the read images PG are displayed in preview, and a page information display unit 142 that displays page information related to the previewed image PG. The document preview screen 140 includes a display image number selection function of allowing the number of images displayed in the preview display area 141 to be selected, and a page-turning function of moving the pages of the preview display area 141 back and forth. Since the number of images PG that can be displayed in the preview display area 141 is limited, the display of all the images PG may extend to a plurality of pages.

In addition, the document preview screen 140 may include a removal level adjusting unit 143 configured to adjust the blank paper removal level. The removal level adjusting unit 143 may include a slider 143A as an operation unit configured to be operated on the screen by input operations of the input units 21 and 101. That is, the removal level adjusting unit 143 may include the slider 143A that is slidingly operated to a position corresponding to the value of the blank paper removal level. The slider 143A illustrated in FIG. 16 basically has the same function as the slider 133A (FIG. 12) of the first embodiment.

The preview display processing unit 761 displays both the image PG and the removal level adjusting unit 143 in a state in which both are disposed to be visually recognizable on the preview screen 140 illustrated in FIG. 16, on the display units 22 and 102.

In addition, by adjusting the blank paper removal level by the operation of the input units 21 and 101, the removal level adjusting unit 133 may include a function of switching the display mode of the image PG to the selected state in which the blank paper removal candidate is selected in association with the adjusted blank paper removal level. In addition, when the image PG is selected by the touch operation by the input unit 21 or a pointing device such as a mouse constituting the input unit 101, the image PG that has become in the selected state is highlighted. In the example illustrated in FIG. 16, the image PG is highlighted by a highlighting unit 145 such as a highlighting frame that individually surrounds the images PG on the selected page 3 and page 4. When the user selects the image PG, the image PG is switched to a blank paper removal candidate and is highlighted by the first highlighting unit 145 such as a display frame, and the page information responding to the image PG in the page information display unit 132 is highlighted by a second highlighting unit 142A such as a display frame surrounding the page information. Accordingly, the user can confirm the image PG selected as the blank paper removal candidate at a glance by the highlighting of the image PG and the highlighting of the page information of the image.

In the example of FIG. 16, in the highlighting, the frame surrounding the image PG (image frame) and the frame surrounding the display area for each image (display area frame) are displayed thickly. The highlighting may be a mark superimposed on the image.

The document preview screen 140 is provided with a selected unit 144 such as a checkbox for setting the enable and disable of the removal level update function. In addition, the removal level adjusting unit 143 may have a configuration in which when the image PG is selected as a blank paper removal candidate, the slider 143A moves in association with the selection and the numerical value indicated by the slider 143A is switched.

In addition, when the image PG selected on the document preview screen 140 is confirmed as a blank paper removal target and then removed, the removal level update function of performing updates to a blank paper removal level satisfying that the removed image PG is a blank paper removal candidate, is provided. The document preview screen 140 is provided with a selected unit 144 configured to be selected to enable (ON) the removal level update function. The selected unit 144 is, for example, a checkbox, but may be a display component such as a radio button, a pull-down type selection unit, and a push button, which is configured to select one from a plurality such as two or more.

In addition, the document preview screen 140 includes a blank paper removal button 146, a completion button 147, and a discarding button 148. When the blank paper removal button 146 is operated by the operation of the input units 21 and 101 and the selected blank paper removal candidate is confirmed, the display switching unit 762 performs display switching that deletes the image PG of the blank paper removal candidate in the selected state from the preview display area 141. The gist in which the image PG that has disappeared from the preview display area 141 is a blank paper removal candidate is stored by information such as a flag. The image data of the image PG that has disappeared from the preview display area 141 is not yet discarded, but may be discarded.

The user can also operate the completion button 147 in a state in which the blank paper removal candidate is selected without using the blank paper removal button 146 to confirm the image of the blank paper removal candidate in the selected state as the blank paper removal target. When the user operates the completion button 147 by the operation of the input units 21 and 101, and the selected blank paper removal candidate is confirmed, the data generation unit 88 removes the image data of the blank paper removal target including the image PG of the blank paper removal candidate from the image data of the document D, and generates scan data (reading data) based on the remaining image data. Alternatively, when the completion button 147 is operated by the operation of the input units 21 and 101, and the selected non-removal candidate is confirmed, the data generation unit 88 removes the image data of the blank paper removal target excluding the image PG of the selected non-removal candidate from the image data of the document D, and generates scan data (reading data) based on the image data of the non-removal candidate.

In addition, before operating the completion button 147, the blank paper removal button 146 may be operated to delete the image of the blank paper removal candidate from the preview display area 141. In this case, when the completion button 147 is operated, the image of the blank paper removal candidate that has already disappeared from the screen and the image of the blank paper removal candidate displayed in the selected state of the blank paper removal candidate are confirmed as the blank paper removal targets. The data generation unit 88 removes the image data confirmed as the blank paper removal target from the image data of the document D, and generates scan data (reading data) based on the remaining image data. The discarding button 148 is operated when it is wanted to discard the image data of the read document D, as in the first embodiment.

Figures 17, 18:
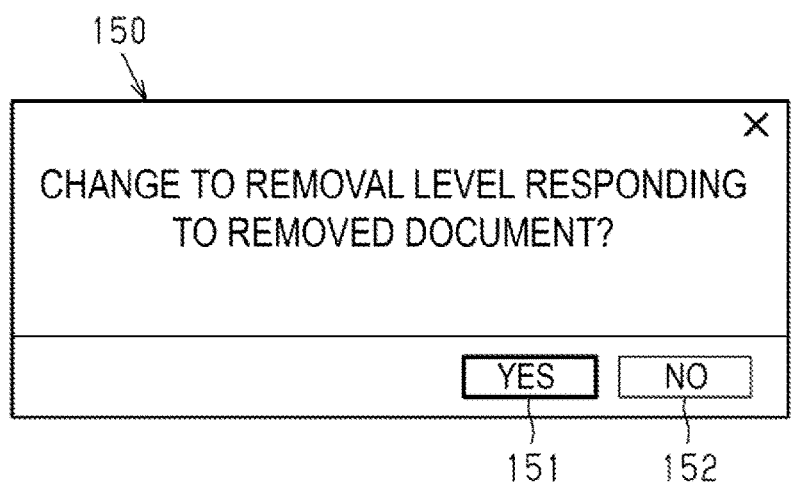
FIG. 17 is a diagram illustrating a management table.
FIG. 18 is a diagram illustrating a confirmation screen.

FIG. 17 illustrates a third management table SD3 that manages the display timing of the preview screen 140 for each scan format and the reflection timing of the setting value of the blank paper removal level changed on the preview screen 140.

Based on the scan format selected on the second setting screen 92, the computers 60 and 120 refer to the third management table SD3 to acquire the display timing of the preview screen 140 and the reflection timing of the setting value of the blank paper removal level.

As illustrated in FIG. 17, in the case of the normal scan and the AFM and continuous job, the display timing of the preview screen 140 is "after the job is ended" for both. In addition, in the case of both the normal scan and the AFM and continuous job, the reflection timing of the setting value of the blank paper removal level is "from the next job" for both. For the AFM and the continuous job also, the display timing of the preview screen 140 is "after the job is ended" for both, and the reflection timing of the setting value of the blank paper removal level is "from the next job" for both.

Figure 19:
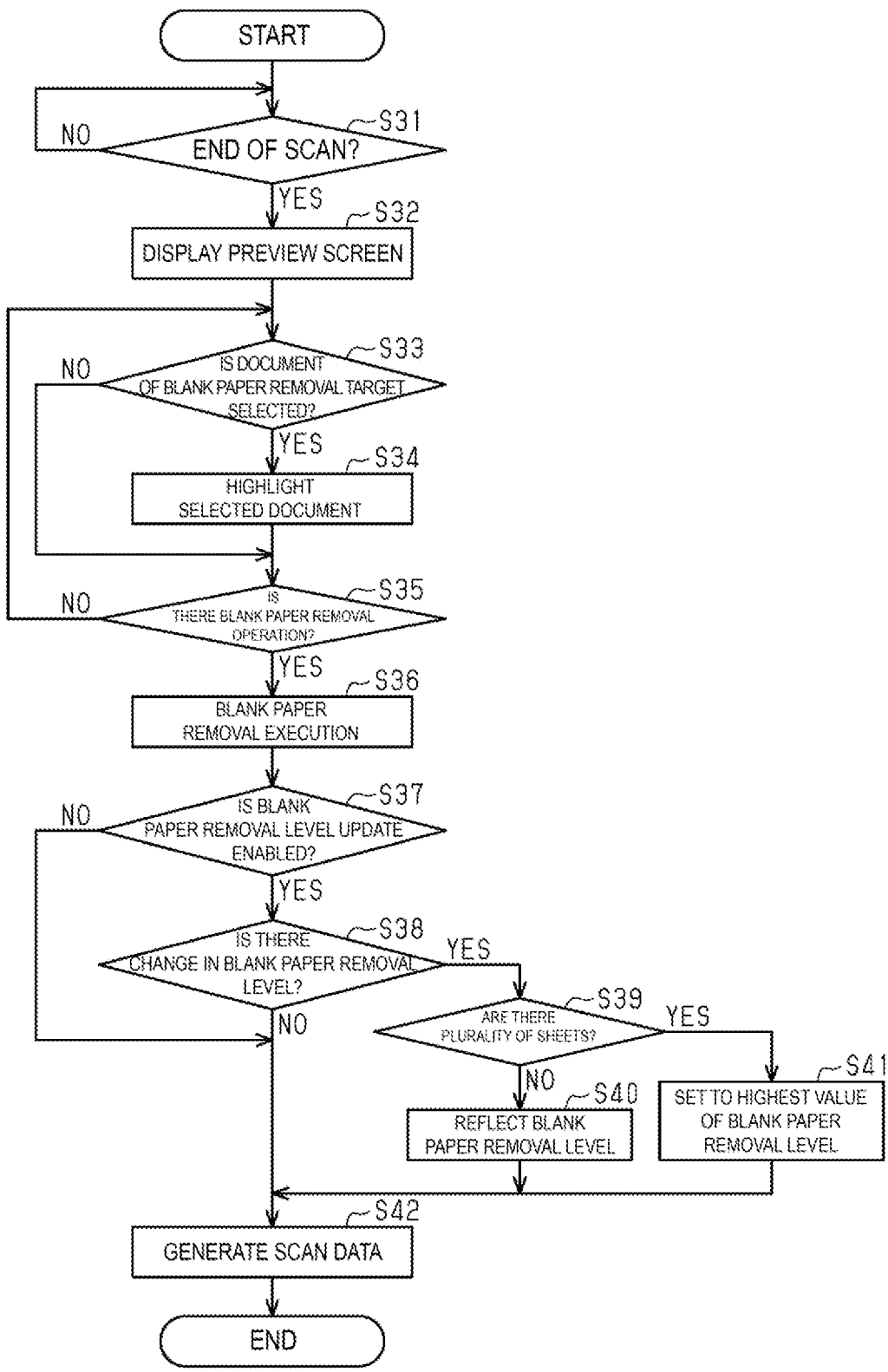
FIG. 19 is a flowchart illustrating a blank paper removal processing routine.

After the start of scan, the computer 120 executes the preview screen display processing illustrated in FIG. 19. In the following, a case in which the computer 120 on the side of the image reading control apparatus 110 executes the program PR of the preview screen display processing will be described as an example, but the same is basically true for a case in which the computer 60 in the image reading apparatus 11 executes the program PR of the preview screen display processing.

First, in a step S31, the computer 120 determines whether the scan has ended. When the scan has ended, the process proceeds to a step S32, and when the scan has not ended, the process proceeds as it is. The step S31 is the processing of determining whether the display timing of the preview screen 140 has been reached. The scan end time determined here is the timing after the job is ended as illustrated in FIG. 17 when reading all the documents D of one job has been finished.

In the step S32, the computer 120 displays the preview screen 140. Specifically, the processing is executed by the preview display processing unit 761. The preview display processing unit 761 generates screen data by performing screen generation processing of incorporating the images of all the read documents D and the page information of each image into the screen, and displays the preview screen 140 illustrated in FIG. 16 on the display unit 102 based on the generated screen data. Specifically, the preview display processing unit 761 performs preview display processing of displaying the preview screen 140 on the display unit 102. In the present embodiment, the processing of the step S32 corresponds to an example of the preview display processing step.

In a step S33, the computer 120 determines whether the document of the blank paper removal target has been selected. When the document of the blank paper removal target is selected, the process proceeds to a step S34, and when the document of the blank paper removal target is not selected, the process proceeds to a step S35. The user confirms the image PG displayed in the preview display area 141 of the preview screen 140, and selects the image PG by the operation of the input unit 101 when there is an image wanted to be removed as a blank paper page. For example, due to the wrinkles of the document D or the color of the paper fibers such as recycled paper, when the document is determined not to be a blank paper document and is displayed on the preview screen, the user wants to remove the document as blank paper, and thus selects the image of the document D as a blank paper removal target.

In the step S34, the computer 120 highlights the selected document. Specifically, the processing is executed by the display switching unit 762. For example, the image PG is highlighted as in the images PG on the third page and the fourth page of the preview screen 140 illustrated in FIG. 16. That is, when the image PG is selected by the operation of the input unit 101, the computer 120 switches the display mode of the image PG to the selected state in which the blank paper removal candidate is selected. Since the selected image PG is highlighted, the user can visually recognize that the selected image PG is in the selected state, selected as a blank paper removal candidate. In the present embodiment, the processing of the step S33 and the step S34 corresponds to an example of the display switching step.

In the step S35, the computer 120 determines whether there has been a blank paper removal operation. When the user finishes selecting the image PG that is a blank paper removal target, the user performs a blank paper removal operation that operates the blank paper removal button 146 by the operation of the input unit 101. This blank paper removal operation corresponds to a confirmation operation that confirms the selected state. When there is a blank paper removal operation, the process proceeds to a step S36, and when there is no blank paper removal operation, the process returns to the step S33. When the user does not perform the blank paper removal operation, the processing of the step S33 to the step S35 is repeatedly executed, and each time the user selects the image PG (affirmative determination in the step S33), the image PG is highlighted (step S34). In this manner, when the selection of the image is ended, the user operates the blank paper removal button 146 using the input unit 101. At this time, since it is determined in the step S35 that there is a blank paper removal operation, the computer 120 proceeds to a step S36.

In the step S36, the computer 120 executes blank paper removal. Specifically, the computer 120 deletes the image PG in the selected state as a blank paper removal candidate from the preview display area 141. As a result, the image PG selected as the blank paper removal target disappears from the preview display area 141.

In a step S37, the computer 120 determines whether the blank paper removal level update is enabled. When the selected unit 144 of the blank paper removal level update function is selected and the blank paper removal level update function is enabled (ON), the process proceeds to a step S38, and on the other hand, when the selected unit 144 is not selected and the blank paper removal level update function is disabled (OFF), the process proceeds to a step S42. When the blank paper removal level update is enabled, the confirmation screen 150 illustrated in FIG. 18 is displayed. For example, the confirmation screen 150 is displayed to be superimposed on the preview screen 140. When the user wants to keep the blank paper removal level update function enabled, the user selects a "Yes" button 151 by the operation of the input unit 101. When the user does not want to update the blank paper removal level, the user selects a "No" button 152 on the confirmation screen 150.

In the step S38, the computer 120 determines whether there is a change in the blank paper removal level. When there is a change in the blank paper removal level, the process proceeds to a step S39, and when there is no change in the blank paper removal level, the process proceeds to the step S42. Here, the blank paper determination unit 87 may perform a blank paper determination based on the blank paper removal level set before the preview screen 140 is displayed based on the image data of the read the document D. When there is the image of the blank paper removal candidate among the images of the document D, it is determined that the blank paper removal level has not changed when all of the images PG in the selected state selected by the user are the images of the blank paper removal candidate. In addition, when the image PG in the selected state selected by the user includes at least one image other than the blank paper removal candidate, it is determined that the blank paper removal level has been changed. Simply, when there is even one image in the selected state as a blank paper removal candidate, it may be determined that the blank paper removal level has been changed.

In the step S39, the computer 120 determines whether there are a plurality of sheets. That is, the computer 120 determines whether there are a plurality of images having a change in the blank paper removal level. When there are not a plurality of sheets, the process proceeds to a step S40, and when there are a plurality of sheets, the process proceeds to a step S41.

In the step S40, the computer 120 reflects the blank paper removal level. That is, the setting is updated to the blank paper removal level at which the blank paper determination unit 87 can determine that one image in which the blank paper removal level is changed is blank paper. Specifically, the processing is executed by the blank paper removal level setting unit 78. The blank paper removal level setting unit 78 acquires the histogram HD based on the image data of the image PG in the selected state, and obtains the blank paper removal level responding to the minimum threshold value PS0 among the threshold values PS0 that are equal to or greater than the value of the print area pixel number PN in the histogram HD. According to the need, it may be confirmed that the obtained blank paper removal level is higher than the currently set blank paper removal level. Then, the blank paper removal level setting unit 78 sets the obtained blank paper removal level.

In the step S41, the computer 120 sets the blank paper removal level to the highest value. That is, among the plurality of images in which the blank paper removal levels have been changed, the setting is updated to the blank paper removal level of the highest value among the plurality of blank paper removal levels at which the blank paper determination unit 87 can determine that each image is blank paper. Specifically, the processing is executed by the blank paper removal level setting unit 78. The blank paper removal level setting unit 78 acquires the histogram HD based on the image data of the image PG in the selected state, and obtains the blank paper removal level responding to the minimum threshold value PS0 among the threshold values PS0 that are equal to or greater than the value of the print area pixel number PN in the histogram HD. According to the need, it may be confirmed that the obtained blank paper removal level is higher than the currently set blank paper removal level. Then, the blank paper removal level setting unit 78 sets the blank paper removal level to the highest value among the obtained plurality of blank paper removal levels. In the present embodiment, the processing of the step S39 to the step S41 correspond to an example of the blank paper removal level setting step.

In the step S42, the computer 120 generates scan data. The processing is performed by the data generation unit 88. The data generation unit 88 generates scan data based on the remaining image data obtained by removing the image data of the blank paper removal candidate including the image PG in the selected state from the image data of the read document D. Specifically, the blank paper removal processing unit 881 removes the image data of the blank paper removal candidate including the image PG in the selected state from the image data of the read document D, and sends the remaining image data to the file format conversion unit 882. The file format conversion unit 882 generates scan data by converting the image data from the blank paper removal processing unit 881 into a file in a predetermined file format set by the user as an output condition. In the present embodiment, the processing of the step S42 corresponds to an example of the data generation step.

According to the second embodiment, the effects (1), (3) to (8), (13) to (16) of the first embodiment can be obtained in the same manner, and the following effects can be obtained.

(17) the preview display processing unit 761 displays an image including at least the image of the non-removal candidate in a selectable state on the display units 22 and 102. When an image is selected by the operation of the input units 21 and 101, the display switching unit 762 switches the display mode of the image to the selected state in which the blank paper removal candidate is selected.

Accordingly, among the images including at least the image of the non-removal candidate displayed on the display units 22 and 102, the user can remove the image of the blank paper removal candidate by selecting the image wanted to be the blank paper removal candidate by the operation of the input units 21 and 101. In addition, the fact that the selected image has become the image of the blank paper removal target can be confirmed on the screens of the display units 22 and 102 by the switching of the display mode of the image.

(18) When at least a portion of the image displayed by the preview display processing unit 761 includes the image of the non-removal candidate and there are a plurality of images changed from the non-removal candidate to the blank paper removal candidate, the blank paper removal level setting unit 78 may set the highest blank paper removal level among the plurality of blank paper removal levels in which each of the plurality of images can be a blank paper removal candidate.

According to the configuration, although the non-removal candidate preview-displayed is changed to a blank paper removal candidate, and there are a plurality of changed images, an appropriate blank paper removal level can be set.

Third Embodiment

The third embodiment will be described with reference to FIGS. 20 and 21. Since the configurations of the image reading apparatus 11 and the image reading control apparatus 110 and the configuration of the blank paper preview screen 130 are basically the same except that the processing contents of the computers 60 and 120 are different, the same reference numerals are given to the same configurations to omit the explanation. In the first embodiment described above, when the slider 133A of the removal level adjusting unit 133 is slidingly operated, the image BP of the non-removal candidate disappears or the image BP of the blank paper removal candidate appears, but the present disclosure is not limited thereto. In the present embodiment, a mark indicating the gist in which it is no longer a blank paper removal candidate is added to the image switched from the blank paper removal candidate to the non-removal candidate. As described above, the highlighting is not limited to the display frame or the like, and may be a mark. The program PR illustrated in FIG. 13 is stored in the non-volatile memory 62 of the image reading apparatus 11 and the storage unit of the host apparatus 100. The program PR includes a blank paper preview screen display processing routine illustrated in FIG. 20, which is the processing of the step S17.

Hereinafter, the blank paper preview screen display processing executed by the computer 120 on the side of the image reading control apparatus 110 will be described. When the computer 60 in the image reading apparatus 11 also executes the operation, the processing contents are basically the same, although the input unit 21 and the display unit 22 are different. In addition, the processing according to FIG. 13 is the same as that of the first embodiment.

After the end of scan, the blank paper preview screen 130 is displayed on the display unit 102 (step S17). After that, the user operates the input unit 101 on the blank paper preview screen 130 and operates the removal level adjusting unit 133 to change the blank paper removal level (step S18) or select the image BP (FIG. 19). When the blank paper removal level is changed (affirmative determination in the step S18), the process returns to the step S12 and the processing of the step S12 to the step S17 is executed. At this time, in the step S17, the blank paper preview screen 130 is redisplayed.

Figure 20:
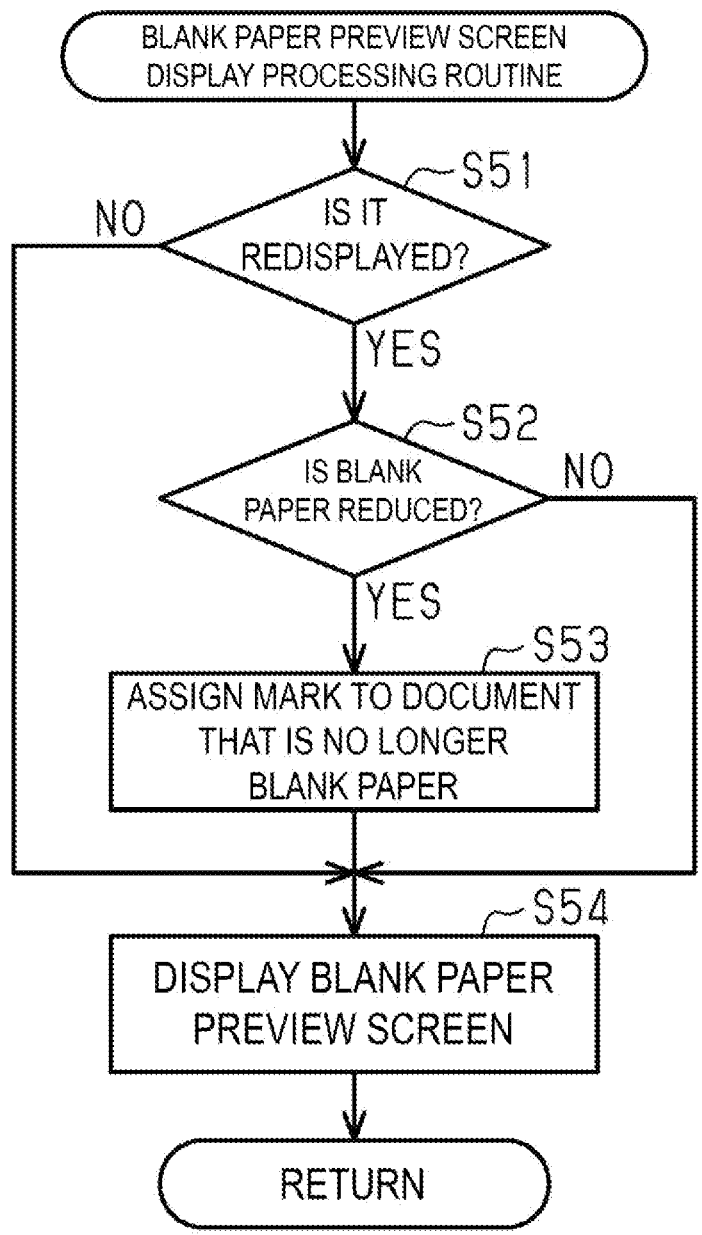
FIG. 20 is a flowchart illustrating a blank paper preview screen display processing routine according to a third embodiment.

The computer 120 executes the blank paper preview screen display processing illustrated in FIG. 20 in the step S17 of FIG. 13.

First, in a step S51, the computer 120 determines whether it is redisplayed. When it is not redisplayed, the process proceeds to a step SM to display the blank paper preview screen 130. The processing is the same as in the first embodiment. On the other hand, when it is redisplayed, the process proceeds to a step S52.

In the step S52, the computer 120 determines whether the blank paper is reduced. When the blank paper is reduced, the process proceeds to a step S53, and when the blank paper is not reduced, the process proceeds to a step SM. For example, as illustrated in FIG. 21, when the removal level adjusting unit 133 is operated to the side in which the value of the removal level becomes small, the blank paper (blank paper removal candidate) determined by the blank paper determination unit 87 as a blank paper document may be reduced. In this case, the process proceeds to the step S53.

In the step S53, the computer 120 assigns a mark to the document that is no longer blank paper. For example, when the removal level adjusting unit 133 is operated to adjust the blank paper removal level, the display switching unit 762 that receives the input of the operation switches the display mode of the image between the blank paper removal candidate and the non-removal candidate in association with the operation to satisfy the blank paper removal level after the adjustment. Then, with respect to the images BP of the first page and the second page that has been switched from the blank paper removal candidate to the non-removal candidate, the display switching unit 762 assigns the mark 155 indicating the gist in which it is a non-removal candidate on the position superimposed on the images BP. That is, the display switching unit 762 generates screen data in which the mark 155 is assigned to the image that is switched from the blank paper removal candidate to the non-removal candidate.

In the step S54, the computer 120 displays a blank paper preview screen. That is, the preview display processing unit 761 displays the blank paper preview screen 130 based on the screen data. As a result, as illustrated in FIG. 21, the images BP on the first page and the second page that is switched from the blank paper removal candidate to the non-removal candidate are assigned the mark 155 superimposed on the image BP as a display mode that is switched to the non-removal candidate. The highlighting of the image may be a display frame replacing the mark 155. In addition, when the user selects the image BP of the blank paper removal candidate (affirmative determination in the step S19), in the next step S20, the display frame may be replaced with the highlighting that assigns the mark 155 to the image BP.

The embodiment described above can also be changed to a form such as the modified example illustrated below. Further, a further modified example may be an appropriate combination of the embodiment described above and the modified example illustrated below, or an appropriate combination of the modified examples illustrated below may be a further modified example.

The result of analyzing the information acquired from the image reading apparatus 11 or the host apparatus 100 via a network such as the Internet may be guided to the user as recommended information. That is, the server that analyzes the information analyzes the information acquired from the host apparatus 100 or the like via the network with the permission of the user, and generates the reading condition information recommended according to the usage situation in which the user uses the image reading apparatus 11 as recommended information. The server may provide the host apparatus 100 of each user on the network with recommended information according to the usage situation of each user via the network and display the information on the display unit 102. The recommended information includes blank paper removal level information. For example, in the host apparatus 100 of a user who frequently reads a text document, an appropriate blank paper removal level value according to the usage situation may be recommended. In the host apparatus 100 of a user who frequently reads a document printed with the page number, the setting value of an appropriate blank paper removal level according to the usage situation may be recommended. In the host apparatus 100 of a user who frequently reads a character-absent document such as an image-only document, an appropriate blank paper removal level value according to the usage situation may be recommended. In the host apparatus 100 of a user who frequently reads a recycled paper document, the setting value of an appropriate blank paper removal level according to the usage situation may be recommended.

The host apparatus 100 may include a registration information management unit composed of software that manages registration condition information registered as favorite information by the user. The registration condition information includes image correction information such as sharpness value and brightness correction value, blank paper removal level information, OCR language information, file generation format information such as JPEG and PDF, or the like. The image reading apparatus 11 may read the registration condition information registered as favorite information by the user from the registration information management unit of the host apparatus 100 and display the information on the display units 22 and 102. In addition, when receiving the job, the image reading apparatus 11 may read the registration condition information registered as favorite information by the user from the registration information management unit of the host apparatus 100 and perform the reading operation of the document D. In addition, the registration information management unit may be a portion of the image reading control apparatus 110 configured by the driver program, or may be separate from the image reading control apparatus 110. For example, the removal level adjusting unit 133 on the blank paper preview screen 130 at the end of scan by the reading operation based on the registration condition information is displayed in a state that indicates a value based on the blank paper removal level information in the registration condition information as the current blank paper removal level. For example, on the blank paper preview screen 130 in FIG. 12, the value of the blank paper removal level "15" indicated by the slider 133A is displayed based on the blank paper removal level information in the registration condition information. In addition, a registration information setting unit that sets whether to register as favorite information is added to the blank paper preview screen 130, and when the registration information setting unit is enabled, the value of the blank paper removal level updated on the blank paper preview screen 130 may be updated as blank paper removal level information managed by the registration information management unit.

The removal level adjusting unit 133 is not limited to the slider 133A. It may be a button array in which a plurality of buttons for each removal level are arranged. In addition, a display frame on which a level numerical value is displayed, and a + button and a − button may be used. In addition, the display frame may be replaced with a display meter. Examples of the display meter include a meter having a plurality of quadrangular blocks arranged in one row, or a bar-shaped display area. The display meter visually indicates the value of the removal level by the number of blocks whose color changes, or the area of the color. The operation unit is not limited to the slider 133A, and besides that, may be a button with a page number for image selection. The button is operated by the input units 21 and 101.

The removal level adjusting unit 133 may be superimposed and displayed on the preview screen. For example, a configuration may be such that when the blank paper preview screen 130 is displayed at the scan end time, there is no removal level adjusting unit 133, and only the enlarged image ZP is displayed on the screen, and when an operation is performed to enable the blank paper removal level adjusting function, the removal level adjusting unit 133 may be displayed. In this case, as illustrated in FIG. 12, the removal level adjusting unit 133 may be displayed at a position that does not overlap with the preview display area 131 and the enlarged image ZP, or may be displayed by being superimposed at a position that overlaps with the preview display area 131.

In the first embodiment, the image of the removal candidate has disappeared, but the image of the removal candidate may be highlighted. For example, the frame of the image of the removal candidate may be highlighted with a thick line or a colored line, or a character, a mark, or a symbol indicating the gist in which it is the removal candidate may be displayed by being superimposed on the image of the removal candidate.

In the second embodiment, the image of the removal candidate selected by the operation is highlighted, but the image of the removal candidate may be deleted.

In the second embodiment, when the blank paper removal is executed under the enabled state of the blank paper removal level update function, the value of the blank paper removal level is adjusted, but when the image of the removal candidate is selected, the value of the blank paper removal level may be adjusted.

In the second embodiment, when the blank paper removal is executed under the enabled state of the blank paper removal level update function, the value of the blank paper removal level is adjusted, but the blank paper removal level update function may constantly be enabled.

In the first embodiment, the preview display processing unit 761 preview-displays the image BP of the blank paper removal candidate, but at least a portion of the image of the read document D may be preview-displayed. The image preview-displayed may be a portion of the images including at least the images of all the blank paper removal candidates, may be all the images of the read document, or may be a portion of the images of all the blank paper removal candidates. In summary, it does not have to be a display method that excludes the preview display of the images of all the blank paper removal candidates.

In the first embodiment, a configuration may be such that when the image BP is selected on the blank paper preview screen 130, the selected image BP becomes a blank paper removal candidate and the unselected image BP becomes a non-removal candidate, but the opposite may be possible. That is, a configuration may be such that the selected image BP is switched from the blank paper removal candidate to the non-removal candidate, and the unselected image BP remains as the blank paper removal candidate.

In the second embodiment, a configuration may be such that when the blank paper removal level is adjusted by operating the removal level adjusting unit 143, the blank paper removal candidate and the non-removal candidate of the image are switched. In this case, when the removal level adjusting unit 143 is operated, the image may disappear and appear in association with the operation, or highlighting or a mark may be assigned to the switched image of the candidate. For example, a configuration may be such that when the removal level adjusting units 133 and 143 are operated in the direction in which the blank paper removal level increases, the image that has been previously a blank paper removal candidate appears as a non-removal candidate, and on the other hand, when the removal level adjusting units 133 and 143 are operated in the direction in which the blank paper removal level decreases, the image that has been previously a non-removal candidate disappears as a blank paper removal candidate.

Figure 21:
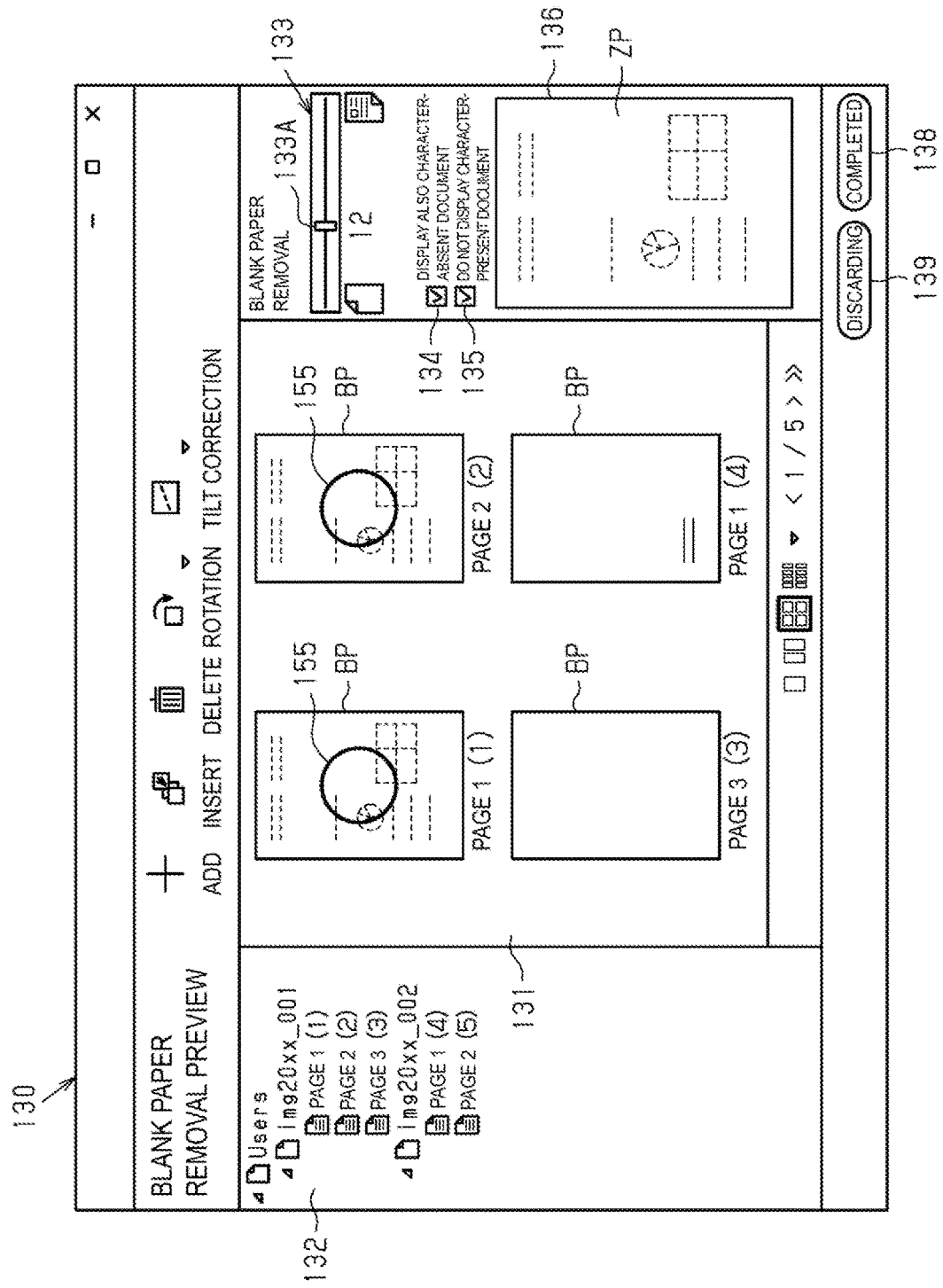
FIG. 21 is a diagram illustrating a blank paper preview screen.

In the first and second embodiments, the highlighting when an image is selected is not limited to the highlighting of the display frame, but may be a mark, a symbol, or the like displayed by being superimposed on the image illustrated in FIG. 21 of the third embodiment. Further, the background color of the image may change, or a moving display such as a vibrating image may be used.

In the third embodiment, the mark is assigned to the image switched from the blank paper removal candidate to the non-removal candidate, but the mark may be assigned to the image switched from the non-removal candidate to the blank paper removal candidate.

When the blank paper removal level is adjusted by operating the removal level adjusting units 133 and 143, the image may not be deleted and appeared, or may not be assigned with a highlight and a mark, and it may be sufficient only to assign a highlight or a mark indicating the switching of the candidate to the responding page information of the page information display units 132 and 142 on the preview screens 130 and 140.

When an image is selected, the image is not highlighted, and it may be sufficient only to assign a highlight or a mark indicating the switching of the candidate to the responding page information of the page information display units 132 and 142.

A configuration may be such that the blank paper preview screen 130 of the first embodiment or the third embodiment and the preview screen 140 of the second embodiment are used in combination.

In each embodiment, the preview display areas 131 and 141 and the removal level adjusting units 133 and 143 may be displayed on different screens.

In the first embodiment, the preview display area 131 and the enlarged display unit 136 may be displayed on different screens.

In each of the embodiments described above, the preview screens 130 and 140 are displayed on the display units 22 and 102 of both the image reading apparatus 11 and the host apparatus 100, but may be displayed on only one of the display units 22 and 102. For example, the image reading control apparatus 110 may cause the preview screens 130 and 140 to be displayed only on the display unit 102 of the host apparatus 100.

The color of the histogram HD generated by the histogram generation unit 84 is not limited to the four colors of RGBY. A three-color histogram of RGB may be used. In addition, a three-color histogram of YUV may be used. In addition, a two-color histogram of RG may be used. A two-color histogram of RB may be used. A two-color histogram of GB may be used. Further, a single color histogram of one color among RGBYUV may be used. In addition, one color of gray scale may be used.

The image reading apparatus in a state in which there is no setting for ON and OFF of the blank paper removal function, and the blank paper removal mechanism is always ON (enabled), may be used.

The configuration may be such that the removal level adjusting units 133 and 143 are not provided. In this case, the blank paper removal level may be set to a predetermined value in advance. In addition, the blank paper removal level may be updated each time the images BP and PG are selected and removed.

The power sources of the transport unit 31 and the discharge unit 32 may not be limited to the same, and the transport unit 31 and the discharge unit 32 may be driven by separate power sources. For example, the power source of the transport unit 31 may be a transport motor, and the power source of the discharge unit 32 may be a discharge motor.

The image sensor is not limited to a CMOS image sensor, and may be, for example, a metal oxide semiconductor (MOS) image sensor or a charge coupled device (CCD) image sensor.

The image sensor 42 is not limited to the linear image sensor, and may be an area image sensor.

Each functional unit in the computer 60 is not limited to being implemented by software by a CPU and hardware by an ASIC, but may be implemented by hardware by an electronic circuit such as field-programmable gate array (FPGA), and may be implemented by either software or hardware.

The material of the document is not limited to paper, and may be a resin film or sheet, woven fabric, metal film, or the like. In this manner, the term "blank paper" as used in the present specification includes the word "paper" for convenience, but the "blank paper" also includes a material other than paper.

The image reading apparatus may be a portion of a multifunction apparatus having a printing function and a copying function in addition to the scanner function.

The image reading apparatus is not limited to the sheet feeding type, but may be a flatbed type. In the case of a flatbed type image reading apparatus, a carriage configured to move along the secondary scanning direction is provided in the main body, and the carriage moves using a scanning motor as a power source and reads the image of the document set on the glass plate of the document stand by a light source and a reading unit provided in the carriage. This type of flatbed type image reading apparatus may be provided with an automatic document feeding apparatus (auto sheet feeder) that automatically feeds a document. In addition, the image reading method and the program in the image reading apparatus can be applied not only to the image reading apparatus but also to the flatbed type image reading apparatus.

Hereinafter, the technical concept grasped from the above-described embodiment and modified example will be described together with effects.

(A) An image reading system including an image reading apparatus that reads a document and an image reading control apparatus that controls the image reading apparatus and including a blank paper removal function of removing an image of a blank paper removal candidate that satisfies a blank paper removal level among images of the document read by the image reading apparatus, as a blank paper page, includes a preview display processing unit configured to preview-display at least a portion of an image among images of a read document in a selectable state on a display unit, a display switching unit configured to switch a display mode of the image to a selected state in which a blank paper removal candidate or a non-removal candidate is selected when the image is selected by an operation of an input unit, a data generation unit configured to generate reading data based on remaining image data obtained by removing image data of a blank paper removal target including a confirmed blank paper removal candidate from image data of the document when the selected state is confirmed by an operation of the input unit, and a blank paper removal level setting unit configured to set a blank paper removal level for selecting the confirmed image in the selected state as a blank paper removal candidate.

According to the configuration, when the user who has confirmed the previewed image selects the image by the operation of the input units, the display mode of the image is switched to the selected state in which the blank paper removal candidate or the non-removal candidate is selected. In addition, it is possible to set a blank paper removal level suitable for the selected state of the image to be removed as blank paper. Accordingly, the user can appropriately perform the selection of the image to be removed as blank paper and the setting of the blank paper removal level with a simple operation.

(B) A determination unit configured to determine that an image that satisfies the blank paper removal level is a blank paper removal candidate and determine that an image that does not satisfy the blank paper removal level is a non-removal candidate based on image data of a read document may be provided, in which the preview display processing unit may preview-display at least a portion of an image determined to be the blank paper removal candidate among the images of the document, on the display unit.

According to the configuration, since at least a portion of the image determined to be a blank paper removal candidate is preview-displayed, the user may select an image wanted to be removed from the images of the blank paper removal candidates. Accordingly, the user can easily select the image of the blank paper document wanted to be removed.

(C) The preview display processing unit may display a removal level adjusting unit configured to adjust the blank paper removal level on the display unit, and when the removal level adjusting unit adjusts the blank paper removal level by an operation of the input unit, the display switching unit may switch a display mode of the image to a selected state in which the blank paper removal candidate or the non-removal candidate is selected in association with a changed blank paper removal level.

According to the configuration, the blank paper removal level can be adjusted by the removal level adjusting unit, and the display mode of the image is switched to the selected state in which the blank paper removal candidate or the non-removal candidate is selected in association with the adjusted blank paper removal level. Accordingly, the user adjusts the blank paper removal level with the removal level adjusting unit and confirms the display mode of the image that is switched in association with the adjusted blank paper removal level, so that the user can appropriately perform the selection of the desired image and the adjustment of the desired blank paper removal level.

(D) The removal level adjusting unit may be a slider that is slidingly operated to a position corresponding to a value of the blank paper removal level.

According to the configuration, when the user slidingly operates the slider, the blank paper removal level is adjusted to a value corresponding to the slide position, and the display mode of the image is switched to the selected state in which the blank paper removal candidate or the non-removal candidate is selected in association with the adjusted blank paper removal level. Accordingly, the user can easily make an adjustment to the desired blank paper removal level. In addition, since it is a slide operation, it is easier to visually recognize which level it is in the whole and how much adjustment should be made as compared with the input of a numerical value, so that adjustment can be easily made to an appropriate blank paper removal level.

(E) The preview display processing unit may display an image including at least an image of the non-removal candidate in a selectable state on the display unit, and the display switching unit may switch a display mode of the image to a selected state in which the blank paper removal candidate is selected when the image is selected by an operation of the input unit.

According to the configuration, among the images including at least the image of the non-removal candidate displayed on the display units, the user can remove the image of the blank paper removal candidate by selecting the image wanted to be the blank paper removal candidate by the operation of the input units. In addition, the fact that the selected image has become the image of the blank paper removal target can be confirmed on the screens of the display units by the switching of the display mode of the image.

(F) In association with an operation of reducing the blank paper removal level by the removal level adjusting unit, an image that does not satisfy the blank paper removal level may be displayed by being changed from the removal candidate to the non-removal candidate.

According to the configuration, when performing the operation of reducing the blank paper removal level by the removal level adjusting unit, the display mode of the image can be seen in which the blank paper removal candidate is changed to the non-removal candidate in association with the value of the blank paper removal level adjusted to be small. Accordingly, it is possible to appropriately adjust the blank paper removal level and select the image to be removed as blank paper.

(G) The preview display processing unit may display both the image and the removal level adjusting unit in a state in which both are disposed to be visually recognizable, on the display unit.

According to the configuration, when operating the removal level adjusting unit, the user can appropriately adjust the blank paper removal level when checking the change in the display of the image.

(H) When a read image is previewed, the preview display processing unit may preview an image based on a latest blank paper removal level that is set at an end of reading of a document before an image is previewed.

According to the configuration, since the image is previewed based on the latest blank paper removal level that is set at the end of reading of the document before being previewed, an appropriate blank paper removal level is easily applied compared to a case in which the user sets the blank paper removal level again before the reading start to read the document this time. Accordingly, it is easy to reduce the number of operations for the user to select an image as a blank paper removal candidate.

(I) The preview display processing unit may display page information of the previewed image on the display unit, and when an image is selected by an operation of the input unit among previewed images, the display switching unit may highlight page information corresponding to the image.

According to the configuration, it is possible to confirm whether the image of the blank paper removal candidate is selected also from the page information of the previewed image. Although an image is mistakenly selected as a blank paper removal candidate, it is easy to find the image. (J) The preview display processing unit may display an enlarged image obtained by enlarging an image selected by an operation of the input unit on the display unit.

According to the configuration, since the selected image can be confirmed by an enlarged image, it is possible to appropriately determine whether the image is necessary to be discarded as a blank paper document.

(K) A first selected unit configured to be selected to include an image of a character-absent document in an image of a blank paper removal candidate to be displayed by the preview display processing unit may be displayed on the display unit.

According to the configuration, since it is possible to select to preview-display the image of the character-absent document, the user can appropriately determine whether the character-absent document should also be removed as a blank paper document by looking at the image. It is possible to reduce the situation in which the necessary image of the character-absent document is removed as blank paper against the user's intention. In addition, it is also possible to meet the needs of the user who do not need to confirm the image of the character-absent document.

(L) A second selected unit configured to be selected not to include an image of a character-present document in an image of a blank paper removal candidate to be displayed by the preview display processing unit, may be displayed on the display unit.

According to the configuration, since it is possible to select whether to display the image of the character-present document, it is possible to select whether to display the image of the character-present document among the images determined as blank paper removal candidates according to the needs of the user. For example, it is possible to eliminate the need to check a blank paper document in which only the characters of the page information are recorded. In addition, although it is determined to be a blank paper removal candidate, it can meet the needs of the user who wants to confirm the image of the character-present document.

(M) When a continuous paper feeding mode, for continuously reading documents of one job as one job when the documents are divided and set a plurality of times, is executed, the preview display processing unit may display at least a portion of the image on the display unit even in the middle of a job at a timing at which reading of a document set once finishes, and the blank paper removal level setting unit may be configured to change the blank paper removal level according to a selected image even in the middle of the job.

According to the configuration, at least a portion of the image is preview-displayed even in the middle of the job when the continuous paper feeding mode is executed, and the blank paper removal level can be changed according to the selected image even in the middle of the job. The image obtained by reading the next set document in the middle of the job can be preview-displayed based on the changed blank paper removal level.

(N) When at least a portion of the image displayed by the preview display processing unit includes an image of a non-removal candidate and there are a plurality of images changed from the non-removal candidate to the blank paper removal candidate, the blank paper removal level setting unit may set a highest blank paper removal level among a plurality of blank paper removal levels for selecting each of the plurality of images as a blank paper removal candidate.

According to the configuration, although the image of the non-removal candidate preview-displayed is changed to a blank paper removal candidate, and there are a plurality of changed images, an appropriate blank paper removal level can be set.

(O) An image reading control apparatus for controlling an image reading apparatus that reads a document, the image reading control apparatus including a blank paper removal function of removing an image that satisfies a blank paper removal level as a blank paper page among images of the document read by the image reading apparatus, includes a preview display processing unit configured to preview-display at least a portion of an image among images of the document read by the image reading apparatus in a selectable state on a display unit, a display switching unit configured to switch a display mode of the image to a selected state in which a blank paper removal candidate or a non-removal candidate is selected when the image is selected by an operation of an input unit, a data generation unit configured to generate reading data based on remaining image data obtained by removing image data of a blank paper removal target including a confirmed blank paper removal candidate from image data of the document when the selected state is confirmed by an operation of the input unit, and a blank paper removal level setting unit configured to set a blank paper removal level for selecting the confirmed image in the selected state as a blank paper removal candidate. According to the configuration, the same effect as that of the image reading system can be obtained.

(P) An image reading apparatus including a blank paper removal function of removing an image that satisfies a blank paper removal level among images obtained by reading an document, as a blank paper page, includes a preview display processing unit configured to preview-display at least a portion of an image among images of a read document in a selectable state on a display unit, a display switching unit configured to switch a display mode of the image to a selected state in which a blank paper removal candidate or a non-removal candidate is selected when the image is selected by an operation of an input unit, a data generation unit configured to generate reading data based on remaining image data obtained by removing image data of a blank paper removal target including a confirmed blank paper removal candidate from image data of the document when the selected state is confirmed by an operation of the input unit, and a blank paper removal level setting unit configured to set a blank paper removal level for selecting the confirmed image in the selected state as a blank paper removal candidate. According to the configuration, the same effect as that of the image reading system can be obtained.

(Q) An image reading method for performing blank paper removal processing of removing an image that satisfies a blank paper removal level as a blank paper page among images obtained by reading a document by an image reading apparatus, includes preview-displaying at least a portion of an image among images of a read document in a selectable state on a display unit, switching a display mode of the image to a selected state in which a blank paper removal candidate or a non-removal candidate is selected when the image is selected by an operation of an input unit, generating reading data based on remaining image data obtained by removing image data of a blank paper removal target including a confirmed blank paper removal candidate from image data of the document when the selected state is confirmed by an operation of the input unit, and setting a blank paper removal level for selecting the confirmed image in the selected state as a blank paper removal candidate. According to the method, the same effect as that of the image reading system can be obtained.

(R) A program executed by a computer implementing a blank paper removal function of removing an blank paper page that satisfies a blank paper removal level among images of a document read by an image reading apparatus, in the computer, executes a preview display processing step of preview-displaying at least a portion of an image among images of a document read by the image reading apparatus in a selectable state on a display unit, a display switching step of switching a display mode of the image to a selected state in which a blank paper removal candidate or a non-removal candidate is selected when the image is selected by an operation of an input unit, a data generation step of generating reading data based on remaining image data obtained by removing image data of a blank paper removal target including a confirmed blank paper removal candidate from image data of the document when the selected state is confirmed by an operation of the input unit, and a blank paper removal level setting step of setting a blank paper removal level for selecting the confirmed image in the selected state as a blank paper removal candidate.

According to the program, by causing a computer to execute the program, the same effect as that of an image reading system can be obtained.

What is claimed is:

1. An image reading system including an image reading apparatus that reads a document and an image reading control apparatus that controls the image reading apparatus and including a blank paper removal function of removing an image of a blank paper removal candidate that satisfies a blank paper removal level among images of the document read by the image reading apparatus, the image reading system comprising:

a preview display processing unit configured to preview-display at least a portion of an image among images of a read document in a selectable state on a display unit;

a display switching unit configured to switch a display mode of the image to a selected state in which a blank paper removal candidate or a non-removal candidate is selected when the image is selected by an operation of an input unit;

a data generation unit configured to, when the selected state is confirmed by an operation of the input unit, generate reading data based on remaining image data obtained by removing image data of a blank paper removal target including the confirmed blank paper removal candidate from image data of the document; and a blank paper removal level setting unit configured to set a blank paper removal level for selecting a blank paper removal candidate based on the confirmed image in the selected state, wherein when a read image is previewed, the preview display processing unit previews an image based on a latest blank paper removal level set at an end of reading of a document before an image is previewed.

2. The image reading system according to claim 1, comprising:

a determination unit configured to determine that an image that satisfies the blank paper removal level is a blank paper removal candidate and determine that an image that does not satisfy the blank paper removal level is a non-removal candidate based on image data of a read document, wherein the preview display processing unit preview-displays at least a portion of an image determined to be the blank paper removal candidate among the images of the document, on the display unit.

3. The image reading system according to claim 2, wherein a second selected unit configured to be selected not to include an image of a character-present document in an image of a blank paper removal candidate to be displayed by the preview display processing unit, is displayed on the display unit.

4. The image reading system according to claim 2, wherein when a continuous paper feeding mode, for continuously reading documents of one job as one job when the documents are divided and set a plurality of times, is executed, the preview display processing unit displays the at least a portion of the image on the display unit even in the middle of the job at a timing at which reading of a document set once finishes, and the blank paper removal level setting unit is configured to change the blank paper removal level according to a selected image even in the middle of the job.

5. The image reading system according to claim 1, wherein the preview display processing unit displays a removal level adjusting unit configured to adjust the blank paper removal level on the display unit, and when the removal level adjusting unit adjusts the blank paper removal level by an operation of the input unit, the display switching unit switches a display mode of the image to a selected state, in which the blank paper removal candidate or the non-removal candidate is selected, in association with a changed blank paper removal level.

6. The image reading system according to claim 5, wherein the removal level adjusting unit is a slider that is slidingly operated to a position corresponding to a value of the blank paper removal level.

7. The image reading system according to claim 5, wherein an image that does not satisfy the blank paper removal level due to an operation of reducing the blank paper removal level by the removal level adjusting unit is displayed as the non-removal candidate instead of the removal candidate.

8. The image reading system according to claim 7, wherein the preview display processing unit displays, on the display unit, both the image and the removal level adjusting unit in a state in which the image and the removal level adjusting unit are disposed to be visually recognizable.

9. The image reading system according to claim 5, wherein the preview display processing unit displays, on the display unit, an enlarged image obtained by enlarging an image selected by an operation of the input unit.

10. The image reading system according to claim 5, wherein a first selected unit configured to be selected to include an image of a character-absent document in an image of a blank paper removal candidate to be displayed by the preview display processing unit, is displayed on the display unit.

11. The image reading system according to claim 1, wherein the preview display processing unit displays, on the display unit, an image including at least an image of the non-removal candidate in a selectable state, and the display switching unit switches a display mode of the image to a selected state in which the blank paper removal candidate is selected when the image is selected by an operation of the input unit.

12. The image reading system according to claim 1, wherein the preview display processing unit displays page information of the previewed image on the display unit, and when an image is selected by an operation of the input unit among previewed images, the display switching unit highlights page information corresponding to the image.

13. The image reading system according to claim 1, wherein when the at least a portion of the image displayed by the preview display processing unit includes an image of a non-removal candidate and there are a plurality of images changed from the non-removal candidate to the blank paper removal candidate, the blank paper removal level setting unit sets a highest blank paper removal level among a plurality of blank paper removal levels for selecting each of the plurality of images as a blank paper removal candidate.

14. An image reading system including an image reading apparatus that reads a document and an image reading control apparatus that controls the image reading apparatus and including a blank paper removal function of removing an image of a blank paper removal candidate that satisfies a blank paper removal level among images of the document read by the image reading apparatus, the image reading system comprising:

a preview display processing unit configured to preview-display at least a portion of an image among images of a read document in a selectable state on a display unit;

a display switching unit configured to switch a display mode of the image to a selected state in which a blank paper removal candidate or a non-removal candidate is selected when the image is selected by an operation of an input unit;

a data generation unit configured to, when the selected state is confirmed by an operation of the input unit, generate reading data based on remaining image data obtained by removing image data of a blank paper removal target including the confirmed blank paper removal candidate from image data of the document;

a blank paper removal level setting unit configured to set a blank paper removal level for selecting a blank paper removal candidate based on the confirmed image in the selected state; and a determination unit configured to determine that an image that satisfies the blank paper removal level is a blank paper removal candidate and determine that an image that does not satisfy the blank paper removal level is a non-removal candidate based on image data of a read document, wherein the preview display processing unit preview-displays at least a portion of an image determined to be the blank paper removal candidate among the images of the document, on the display unit, and wherein a second selected unit configured to be selected not to include an image of a character-present document in an image of a blank paper removal candidate to be displayed by the preview display processing unit, is displayed on the display unit.

15. An image reading system including an image reading apparatus that reads a document and an image reading control apparatus that controls the image reading apparatus and including a blank paper removal function of removing an image of a blank paper removal candidate that satisfies a blank paper removal level among images of the document read by the image reading apparatus, the image reading system comprising:

a preview display processing unit configured to preview-display at least a portion of an image among images of a read document in a selectable state on a display unit;

a display switching unit configured to switch a display mode of the image to a selected state in which a blank paper removal candidate or a non-removal candidate is selected when the image is selected by an operation of an input unit;

a data generation unit configured to, when the selected state is confirmed by an operation of the input unit, generate reading data based on remaining image data obtained by removing image data of a blank paper removal target including the confirmed blank paper removal candidate from image data of the document; and a blank paper removal level setting unit configured to set a blank paper removal level for selecting a blank paper removal candidate based on the confirmed image in the selected state, wherein when the at least a portion of the image displayed by the preview display processing unit includes an image of a non-removal candidate and there are a plurality of images changed from the non-removal candidate to the blank paper removal candidate, the blank paper removal level setting unit sets a highest blank paper removal level among a plurality of blank paper removal levels for selecting each of the plurality of images as a blank paper removal candidate.

* * * * *